United States Patent
Hiraga et al.

(10) Patent No.: US 6,452,710 B1
(45) Date of Patent: Sep. 17, 2002

(54) OPTICAL ELEMENT, OPTICAL CONTROL METHOD AND DEVICE USING THIS OPTICAL ELEMENT, AND METHOD OF MANUFACTURING OPTICAL ELEMENT

(75) Inventors: Takashi Hiraga, c/o Electrotechnical Laboratory of Agency of Industrial Science and Technology of 1-4 Umezono 1-chome, Tsukuba-shi, Ibaraki 305-8568 (JP); Tetsuo Moriya, c/o Electrotechnical Laboratory of Agency of Industrial Science and Technology of 1-4 Umezono 1-chome, Tsukuba-shi, Ibaraki 305-8568 (JP); Norio Tanaka, Tokyo (JP); Hiromitsu Yanagimoto, Tokyo (JP); Ichiro Ueno, Yokohama (JP); Koji Tsujita, Yokohama (JP)

(73) Assignees: National Institute of Advanced Industrial Science and Technology, Tokyo (JP); Dainichiseika Color & Chemicals Mfg. Co., Ltd., Tokyo (JP); Takashi Hiraga, Tsukuba (JP); Tetsuo Moriya, Tsukuba (JP)

( * ) Notice: Subject to any disclaimer, the term of this patent is extended or adjusted under 35 U.S.C. 154(b) by 0 days.

(21) Appl. No.: 09/485,058
(22) PCT Filed: Aug. 7, 1998
(86) PCT No.: PCT/JP98/03538
§ 371 (c)(1),
(2), (4) Date: Feb. 3, 2000
(87) PCT Pub. No.: WO99/08149
PCT Pub. Date: Feb. 18, 1999

(30) Foreign Application Priority Data

Aug. 8, 1997 (JP) ............................................. 9-214816
Oct. 14, 1997 (JP) ............................................. 9-280145

(51) Int. Cl.[7] ............................. G02F 1/03; G02F 1/29
(52) U.S. Cl. ....................... 359/244; 359/288; 359/289; 359/299; 359/350
(58) Field of Search ................................ 359/244, 288, 359/289, 299, 350

(56) References Cited

U.S. PATENT DOCUMENTS

| 4,994,672 A | 2/1991 | Cross et al. ................. 250/330 |
| 5,121,246 A | 6/1992 | Lasher et al. ................ 359/288 |

FOREIGN PATENT DOCUMENTS

EP        0 441 594 A2    8/1991

(List continued on next page.)

OTHER PUBLICATIONS

Stern M. B. et al.: "Dry Etching For Coherent Refractive Microlens Arrays" Optical Engineering, Soc. Of Photo–Optical Instrumentation Engineers. Bellingham, US, vol. 33, No. 11, Nov. 1, 1994, pp. 3547–3551, XP000475097 ISSN: 0091–3286.

(List continued on next page.)

Primary Examiner—Evelyn A Lester
(74) Attorney, Agent, or Firm—Oliff & Berridge, PLC

(57) ABSTRACT

An optical element, optical control device and optical control method are provided which demonstrate a large, rapid optical response using a laser light of low output as a control light. A signal light 1 is emitted from an optical source 1. A signal light 2 emitted from an optical source 2. A control light and the signal light are converged by a condenser lens 7, and irradiate an optical element 8. Only the signal light is detected by a photodetector 22 through a light receiving lens 9 and a wavelength selection filter 20. A thermal lens is formed reversibly in the optical element and switching the control light ON and OFF modulates the intensity of the signal light. The optical element has a laminar structure comprising a heat transfer film/heat insulation film/light absorption film/heat insulation film/heat transfer film, for example, and a sufficiently large and rapid optical response is obtained using low output laser light as the control light by adjusting the thickness of the light absorption film so that it does not exceed twice the confocal length of the converged control light.

21 Claims, 18 Drawing Sheets

FOREIGN PATENT DOCUMENTS

| | | | |
|---|---|---|---|
| EP | 0-620-201 A | 10/1994 | |
| EP | 0 881 518 A1 | * 2/1998 | |
| JP | 53-137884 | 12/1978 | |
| JP | 55-100503 | 7/1980 | |
| JP | 55-108603 | 8/1980 | |
| JP | 59-68723 | 4/1984 | |
| JP | 61-129621 | 6/1986 | |
| JP | 63-89805 | 4/1988 | |
| JP | 63-236013 | 9/1988 | |
| JP | 64-73326 | 3/1989 | |
| JP | 3-122614 | 5/1991 | |
| JP | 7-62022 | 3/1995 | |
| JP | 7-318416 | 12/1995 | |
| JP | 8-286220 | 11/1996 | |

OTHER PUBLICATIONS

Kohlur U. et al.: "Fabrication of microlenses by plasmaless isotropic etching combined with plastic moulding" Sensors and Actuators A, Elsevier Sequoia S. A., Lausanne, Ch, vol. 53, No. 1, May 1, 1996, pp. 361–363, XP004018173 ISSN: 0924–4247.

Song et al., The intensity–dependent refractive index of chemically enhanced bacteriorhodopsin, Optics Communications, vol. 112, No. 5, Dec. 1994, pp. 296–301.

Strain et al., Measurement of the absorptance of fused silica at $\lambda=514.5$ nm, Optics Communications, vol. 117, No. 5, Jun. 1995, pp. 385–388.

Wu et al., Non–destructive evaluation of thin film coatings using a laser–induced surface thermal lensing effect, Thin Solid Films, vol. 290–291, pp. 271–277. (1996).

* cited by examiner (a)

(b)

(a)

(b)

OPTICAL ELEMENT, OPTICAL CONTROL METHOD AND DEVICE USING THIS OPTICAL ELEMENT, AND METHOD OF MANUFACTURING OPTICAL ELEMENT

FIELD OF THE INVENTION

This invention relates to an optical element useful, for example, in the field of optoelectronics and photonics, such as optical communications and optical information processing, and to an optical control method and method of manufacturing an optical element using such an optical element.

BACKGROUND OF THE INVENTION

In the field of optoelectronics and photonics, much research is being carried out on light and optical control methods which attempt to modulate the intensity (amplitude) or frequency (wavelength) of light without using electronic circuitry, by using the change of transmissivity or refractive index caused by irradiating an optical element produced by fabricating an optical material or optical composition with light.

When the properties of light are used to perform parallel optical logic computing and image processing, "spacial light modulators" for performing certain types of modulation such as varying the optical intensity distribution of the beam cross-section are of great importance, and optical control techniques are also expected to find application in this area.

Phenomena to which light and optical control methods are expected to be applied are saturable absorption, nonlinear refraction, nonlinear optical effects such as the photorefractive effect and photochromic phenomena, and these are now attracting wide attention.

A phenomenon is known wherein light in a first wavelength region excites absorption of light in a second wavelength region different from the first wavelength region without an accompanying change of molecular structure. This phenomenon may be referred to as "excited state absorption", "induced absorption" or "transient absorption."

In one example of an attempt to produce excited state absorption, in Japanese Patent Laid-open publication No. Sho 53-137884, an optical conversion technique is reported wherein a liquid or solid containing a porphyrin compound and an electron acceptor is irradiated with at least two kinds of light of differing wavelength, and the information contained in light of one wavelength is transferred to light of the other wavelength. In Japanese Patent Laid-open publication No. Sho 55-100503 and Japanese Patent Laid-open publication No. Sho 55-108603, a propagation light is selected corresponding to the time-dependent variation of excited light, using the difference in the spectrophotometer spectrum between the ground state and excited state of organic compounds such as porphyrin derivatives.

In Japanese Patent Laid-open publication No. Sho 61-129621, a radiant energy transmission control method is disclosed comprising a step wherein a first photon flux is introduced into a barium crown glass fiber doped with uranium oxide without attenuation, the first photon flux is attenuated by introducing a second photon flux, energy level 2 of the fiber is populated, part of the first photon flux is absorbed to populate energy level 3 and part of energy level 3 then returns to energy level 2 so as to further attenuate the first photon flux.

Japanese Patent Laid-open publication No. Sho 63-89805 discloses a plastic optical fiber that contains an organic compound such as a porphyrin dielectric in its core having an absorption that corresponds to a transition to a triplet state higher than the triplet state excited by light. Japanese Patent Laid-open publication No. Sho 63-236013 discloses an optical functional device which performs switching wherein crystals of a cyanine dye such as cryptocyanine are irradiated with light of a first wavelength to excite the molecules, the molecules are irradiated with light of a second wavelength different from that of the first wavelength, and light of the second wavelength is either transmitted or reflected according to the optical excitation state due to light of the first wavelength. In Japanese Patent Laid-open publication No. Sho 64-73326, a light signal modulating medium is disclosed comprising a photo-induced electron shift material such as a porphyrin dielectric in a matrix material which is irradiated by light of a first and second wavelength, and optical modulation is performed using the difference of absorption spectrum between the excited and ground states of the molecule.

As optical apparatus used in this prior art, Japanese Patent Laid-open publication No. Sho 55-100503, Japanese Patent Laid-open publication No. Sho 55-108603 and Japanese Patent Laid-open publication No. Sho 63-89805 disclose a device structure wherein a light propagating optical fiber is wrapped around an exciting light source (for example, a flash lamp). In Japanese Patent Laid-open publication No. Sho 53-137884 and Japanese Patent Laid-open publication No. Sho 64-73326, a device is disclosed wherein the whole of a propagation part corresponding to signal light in a light-responsive optical element is irradiated with a control light which is not converged, and is in fact diverged by a means such as a projecting lens.

Other methods in the prior art perform modulation of light using the refractive index distribution due to a thermal effect. In the aforesaid prior art, studies are also being carried out on methods to modulate light using the refractive index distribution due to the thermal effect.

In Japanese Patent Laid-open publication No. Sho 59-68723, an optical modulator is disclosed wherein an electrical signal passes through a heat emitting resistor, and the wavefront of a light flux is modified due to a refractive index distribution in a liquid medium in which a refractive index distribution is produced by heat from the heat emitting means. It is described that a cycle is performed of the order of kHz or msec from formation to extinction of the refractive index distribution. Further, in Japanese Patent Laid-open publication No. Sho 60-130723, a method is disclosed for converting near infra-red control light into heat energy in a heat absorbing layer, transmitting this heat to a thermal effect medium via a near infrared light reflecting layer and visible light reflecting layer, and converting the wavefront of a light flux incident on the visible light reflecting layer using the refractive index distribution produced in the thermal effect medium.

However, in these methods for modulating light using refractive index distribution due to the aforesaid thermal effect, there is a long heat propagation path until a thermal effect is produced, and as the heat is propagated while the surface area of an increased temperature part increases relative to the surface area of the control beam, the volume and heat capacity of the propagation path increases, the usage efficiency of energy supplied from the control beam is low, and a high speed response cannot be expected.

In all of these prior art techniques, very high-density optical power is required to cause a change of transmissivity or refractive index that is sufficient for practical purposes.

The response to optical irradiation is slow, fine adjustment of the optical system is necessary, and there is a large variation in the control light output if there is a slight change in the optical system. For these reasons, a practical system has not yet been developed.

To resolve the above problems in the prior art, the following two inventions have been disclosed relating to optical control methods and optical control devices which aim to induce an optical response of sufficient magnitude and speed from a photoresponsive optical element using as low a power as possible. Japanese Patent Laid-open publication No. Hei 8-286220 discloses an optical control technique wherein control light is made incident on an optical element comprising a photoresponsive composition, and intensity modulation and/or light flux density modulation of a signal light which passes through the optical element is performed by reversibly varying the transmissivity and/or refractive index of the signal light in a wavelength region different from that of the control light. The control light and signal light are respectively converged and irradiated to the optical element, and the optical paths of the control light and signal light are arranged so that the regions in which the photon densities are highest in the vicinity of the foci of the control light and signal light, overlap. In Japanese Patent Laid-open publication No. Hei 8-151133 and Japanese Patent Laid-open publication No. Hei 8-286220, a method is disclosed wherein, in a diverging signal light flux which has been transmitted through or reflected by an optical element, part of the flux in a region strongly affected by intensity modulation and/or light flux density modulation is separately extracted. Another method is disclosed wherein, in a diverging signal light flux which has been transmitted through or reflected by an optical element, part of the flux in a region strongly affected by intensity modulation and/or light flux density modulation is separately extracted by performing the extraction within an angular range (aperture angle) smaller than the divergence angle of the flux. Although these are very good methods, it is not easy to adjust an optical system to satisfy the necessary condition that "the control light and signal light are respectively converged and irradiated to an optical element, and the optical paths of the control light and signal light are arranged so that the regions in which the photon densities are highest in the vicinity of the foci of the control light and signal light, overlap," and the result is easily affected by changes in the component elements of the device.

It is therefore an object of this invention to resolve the above problems, and to provide an optical control method and device that provides a sufficiently strong and rapid optical response from a photoresponsive optical element using as low an optical power as possible. It is a further object of this invention to provide an optical control method and device that allow easy adjustment of an optical system, and allow some tolerance therein.

As an example of a method of manufacturing a plastic microlens, a method of manufacturing a refractive index distribution planolens from an organic polymer material (plastic) by osmosis and diffusion of a monomer is disclosed in "M. Oikawa, K. Iga, T. Sanada: Jpn. J. Appl. Phys., 20(1), L51–L54 (1981)". In this method, a refractive index distribution lens is monolithically formed on a flat substrate by a monomer exchange technique. For example, methyl methacrylate (n=1.494) as a low refractive index plastic is diffused into a flat plastic substrate of polydiacrylisophthalate (n=1.570) which has a high refractive index from a 3.6 mm φ circular disk mask.

However, to manufacture a flat microlens having a predetermined refractive index distribution by this method, the setting of manufacturing conditions is a complex matter, such as the selecting of resin compositions having different refractive indices but which can be processed by the monomer exchange method, selecting the size of the above circular disk, and selecting the right temperature for monomer exchange.

A method of manufacturing a plastic microlens array by embossing the sheet surface of a thermoplastic polymer compound is described in P. Pantelis, D. J. Mccartney: Pure Appl.Opt., 3(2), 103–108 (1994). It is reported that a lens array comprising plural lenses of diameter approximately 1 to 2 mm may be manufactured by a high temperature technique applied to, for example, a polycarbonate sheet. In the case of this method, there is much room for improvement regarding the manufacture of the original plate to be embossed.

Further, in Y. Koike, A. Kanemitsu, Y. Shioda, E. Nihei, Y. Otsuka: Appl. Opt., 33(16), 3394–3400 (1994), it is reported that a refractive index distribution type polymer ball lens (φ 0.5–1.1 mm) having a linear or second order spherical refractive index distribution and a small spherical aberration was manufactured by suspension polymerization of an acrylic resin. As can be easily understood, according to this method, there are many limitations in manufacturing a microlens according to design specifications by simultaneously controlling size and refractive index distribution.

This invention was conceived to overcome the above defects in the prior art, provide an optical element comprising a plastic microlens in which the size, shape and refractive index are controlled, and to provide a method of manufacturing the same.

DISCLOSURE OF THE INVENTION

To achieve the above objects, an optical element according to a first invention of this application comprises at least a light absorption film used to perform intensity modulation and/or light flux density modulation utilizing a thermal lens effect based on a reversible refractive index distribution produced by respectively converging a control light and a signal light of different wavelengths and irradiating them to the light absorption film, the wavelength of the control light being selected from the absorption band of the light absorption film, and bringing at least the control light to a focus in the light absorption film so as to produce a temperature rise in the region of the light absorption film which absorbed the control light and the surrounding region, the thickness of the light absorption film not exceeding twice the confocal length of the converged control light.

Herein, the signal light and control light are incident effectively perpendicular to the optical element to minimize losses due to reflection.

The confocal length mentioned here is the distance of an interval over which the light flux converged by a converging means such as a convex lens may be considered substantially parallel in the vicinity of the beam waist (focus). When the amplitude distribution of the electric field of the advancing beam cross-section, i.e., the energy distribution of the light flux, is a Gaussian beam having Gaussian distribution, a confocal length Zc is given by equation (1) using the circular constant π, a beam waist radius $\omega_0$ and wavelength $\lambda$.

$$Zc = \pi \omega_0^2 / \lambda \qquad (1)$$

Regarding the lower limit of the thickness of the light absorption film, it is preferable that this is as thin as possible provided that an optical response can be detected.

To achieve the above object, in an optical element according to a second invention of this application as defined in Claim 1, wherein a light transmitting heat insulation film is provided in the wavelength band of the control light and the signal light on either or both sides of the light absorption film.

To achieve the above object, in an optical element according to a third invention of this application as defined in Claim 1 or 2, wherein a heat transfer film is provided on either or both sides of the light absorption film when the heat insulation film is not present, and a heat transfer film is provided on either or both sides of the light absorption film through the intermediary of the neat insulation film when the heat insulation film is present.

To achieve the above object, in an optical element according to a fourth invention of this application as defined in any of Claims 1 to 3, wherein the light absorption film and/or heat insulation film and/or heat transfer film are comprised of self-supporting materials.

To achieve the above object, in an optical element according to a fifth invention of this application as defined in any of Claims 1 to 4, wherein a light reflecting film having an aperture large enough for the converged, irradiated control light and signal light to pass, is provided on the control light incidence side of the light absorption film, and is laminated on a heat insulation film and/or a heat transfer film when a heat insulation film and/or a heat transfer film is/are present.

To achieve the above object, in an optical element according to a sixth invention of this application as defined in any of Claims 1 to 5, wherein the light absorption film contains a pigment or a dye molecular aggregate which absorbs light in the wavelength band of the control light.

To achieve the above object, in an optical element according to a seventh invention of this application as defined in any of Claims 1 to 6, wherein a light transmitting film is laminated on a light absorption film, heat insulation film or light reflecting film, and a convex lens which functions as a converging means for the control light is laminated on the incidence side of the control light on the light transmitting film.

To achieve the above object, in an optical element according to an eighth invention of this application, wherein a convex lens is formed on a substrate by filling a resin into a planoconvex lens cavity between a lens plate having at least one depression and the substrate, an optical function point is arranged at the focus of the convex lens, and light incident on the optical function point is converged by the convex lens so that the flux density of the light irradiating the optical function point is increased.

To achieve the above object, in an optical element according to a ninth invention of this application as defined in Claim 8, comprising at least a light absorption film wherein intensity modulation and/or light flux density modulation is/are performed using a thermal lens based on a reversible refractive index distribution produced by respectively converging a control light and a signal light of different wavelengths and irradiating them to the light absorption film, the wavelength of the control light is selected from the absorption band of the light absorption film, and at least the control light is brought to a focus in the light absorption film so as to produce a temperature rise in the region of the light absorption film which absorbed the control light and the surrounding region.

To achieve the above object, in an optical element according to a tenth invention of this application as defined in claim 8 or 9, the convex lens is formed by heat melting compression of a thermoplastic resin powder filled in a convex lens type cavity between the lens plate and substrate.

To achieve the above object, in a light control method according to an eleventh invention of this application, intensity modulation and/or light flux density modulation is/are performed using a thermal lens based on a reversible refractive index distribution produced by respectively converging a control light and a signal light of different wavelengths and irradiating them to a light absorption film of an optical element according to any of Claims 1 to 6 or Claim 9, wherein the wavelength of the control light is selected from the absorption band of the light absorption film, and at least the control light is brought to a focus in the light absorption film so as to produce a temperature rise in the region of the light absorption film which absorbed the control light and the surrounding region.

To achieve the above object, a light control method according to a twelfth invention of this application is characterized in that intensity modulation and/or light flux density modulation is/are performed using a thermal lens based on a reversible refractive index distribution produced by respectively irradiating the control light and signal light as parallel beams to the convex lens of the optical element according to Claim 7 or 9, and at least the control light is brought to a focus in the light absorption film so as to produce a temperature rise in the region of the light absorption film which absorbed the control light and the surrounding region.

To achieve the above object, there is provided a light control method according to a thirteenth invention of this application as defined in Claim 11 or 12, wherein signal light flux in a region strongly affected by intensity modulation and/or light flux density modulation is separately extracted by extracting a signal light flux which diverges after it has passed through the optical element within an angular range smaller than the divergence angle of the signal light flux.

To achieve the above object, in a light control device according to a fourteenth invention of this application, intensity modulation and/or light flux density modulation are performed using a thermal lens based on a reversible refractive index distribution produced by respectively converging a control light and a signal light of different wavelengths and irradiating them to a light absorption film of an optical element according to any of Claims 1 to 6, the wavelength of the control light being selected from the absorption band of the light absorption film, so as to produce a temperature rise in the region of the light absorption film which absorbed the control light and the surrounding region, wherein a converging means is provided for respectively converging the control light and signal light, the optical paths of the control light and signal light being so arranged that the regions in which the photon densities are highest in the vicinity of the foci of the control light and signal light overlap, and the light absorption film of the optical element is arranged in a position where the regions in which the photon densities are highest in the vicinity of the foci of the control light and signal light overlap.

To achieve the above object, in a light control device according to a fifteenth invention of this application, intensity modulation and/or light flux density modulation is/are performed using a thermal lens based on a reversible refractive index distribution produced by respectively converging a control light and a signal light as parallel beams respectively and irradiating them to a convex lens of an optical element according to Claim 7 or 9, producing a temperature rise in the region of the light absorption film which absorbed the control light and the surrounding region, wherein a converging means is provided for respectively converging the control light and signal light, the optical paths of the control light and signal light being so arranged that the regions in which the photon densities are highest in the vicinity of the foci of the control light and signal light overlap, and the light absorption film of the optical element is arranged at a position where the regions in which the photon densities are highest in the vicinity of the foci of the control light and signal light overlap.

To achieve the above object, in a light control device according to a sixteenth invention of this application as defined in Claim 14 or 15, the means which separately extracts signal light flux in a region strongly affected by intensity modulation and/or light flux density modulation is a means which extracts a signal light flux which diverges after it has passed through the optical element within an angular range smaller than the divergence angle of the signal light flux.

To achieve the above object, in a light control method according to a seventeenth invention of this application, in the light control method for forming a convex lens by filling a resin in a flat lens cavity between a lens plate having at least one depression and a substrate, said lens plate used is manufactured by a method wherein a photoresist is coated on a base material surface of the lens plate, etching of the base material is performed after forming a pattern having plural apertures on the photoresist, and the diameter of the apertures is increased as etching proceeds by etching the photoresist itself so as to form depressions in the base material surface.

BRIEF DESCRIPTION OF THE DRAWINGS

FIG. 3 is a schematic diagram showing a situation in the vicinity of the focus of a Gaussian beam converged by a condenser lens or the like.

PREFERRED EMBODIMENTS OF THE INVENTIONS

Figure 1:
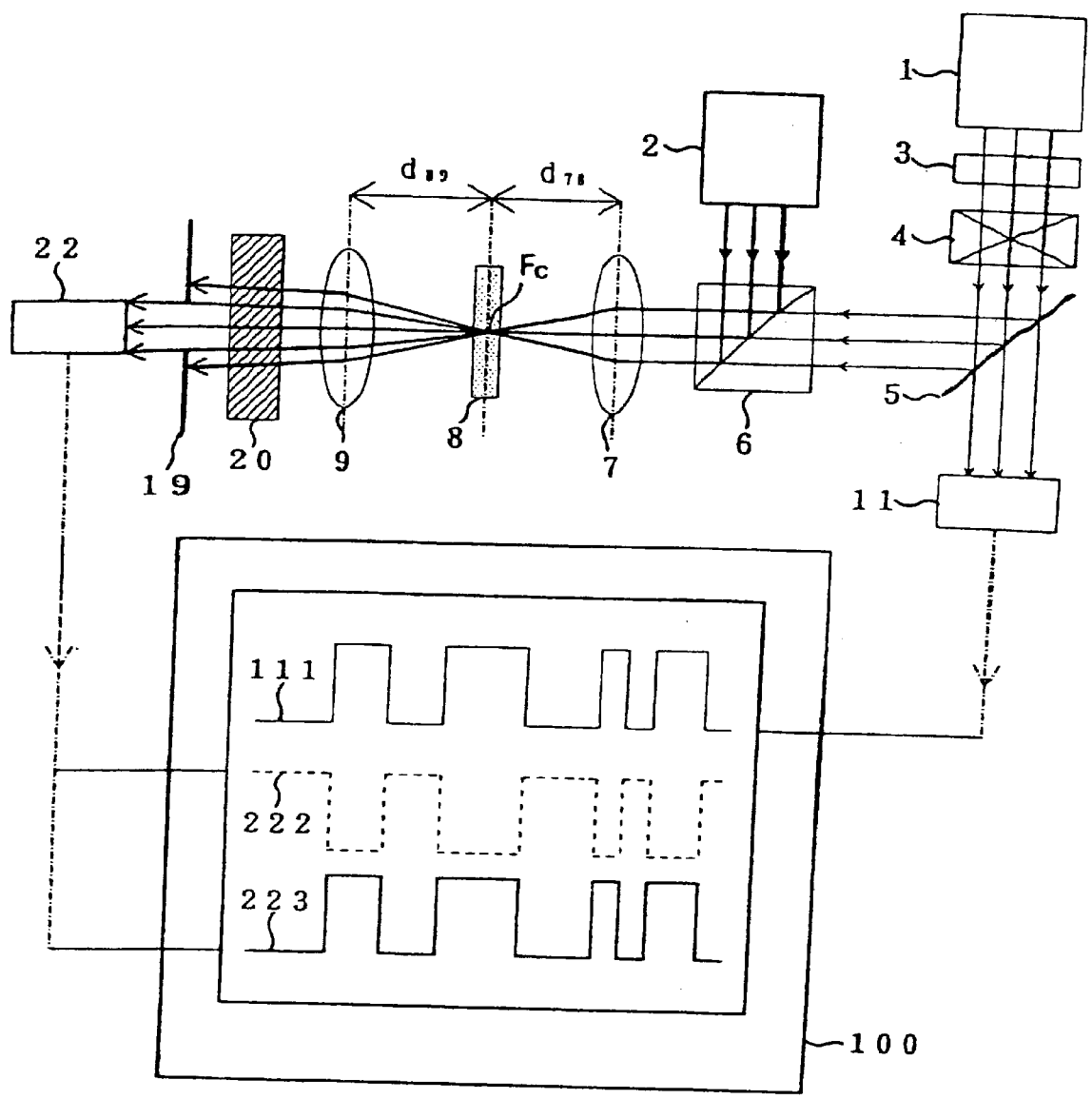
FIG. 1 is a schematic diagram showing the typical construction of a device used in this invention.

Hereafter, specific embodiments of this invention will be described.

[Structure of Optical Element]

The optical element of this invention has a single layer or laminar film type structure. The following are typical examples of a structure of this type.

(1) Light absorption film alone
(2) Light absorption film/heat insulation film
(3) Heat insulation film/light absorption film/heat insulation film
(4) Light absorption film/heat transfer film
(5) Heat transfer film/light absorption film/heat transfer film
(6) Light absorption film/heat insulation film/heat transfer film
(7) Heat transfer film/light absorption film/heat insulation film
(8) Heat transfer film/light absorption film/heat insulation film/heat transfer film
(9) Heat transfer film/heat insulation film/light absorption film/heat insulation film
(10) Heat transfer film/heat insulation film/light absorption film/heat insulation film/heat transfer film
(11) Convex lens/light transmitting film/optical element according to any of the above (1) to (10).

When the composition of a laminar film is asymmetrical, e.g. in the case of (2) above, "light absorption film/heat insulation film", the control light may be arranged to be incident from the light absorption film side, or from the heat insulation film side. Therefore, the composition of a convex lens/light transmission layer is for example as follows:

(12) Convex lens/light transmitting film/light absorption film/heat insulation film
(13) Convex lens/light transmitting film/heat insulation film/light absorption film.

When a light reflecting film having apertures large enough for the converged, irradiated control light and signal light to pass is provided on the control light incidence side of the light absorption film, a light reflecting film is laminated on the heat insulation film and/or heat transfer film when the heat insulation film and/or a heat transfer film are present. The composition in that case is as follows.

(14) Light reflecting film/optical element according to any of the above (1) to (10)
(15) Convex lens/light transmitting film/light reflecting film/optical element according to any of the above (1) to (10)

In addition, an antireflection layer may be provided on the incidence surface and emitting surface if needed.

Figure 16:
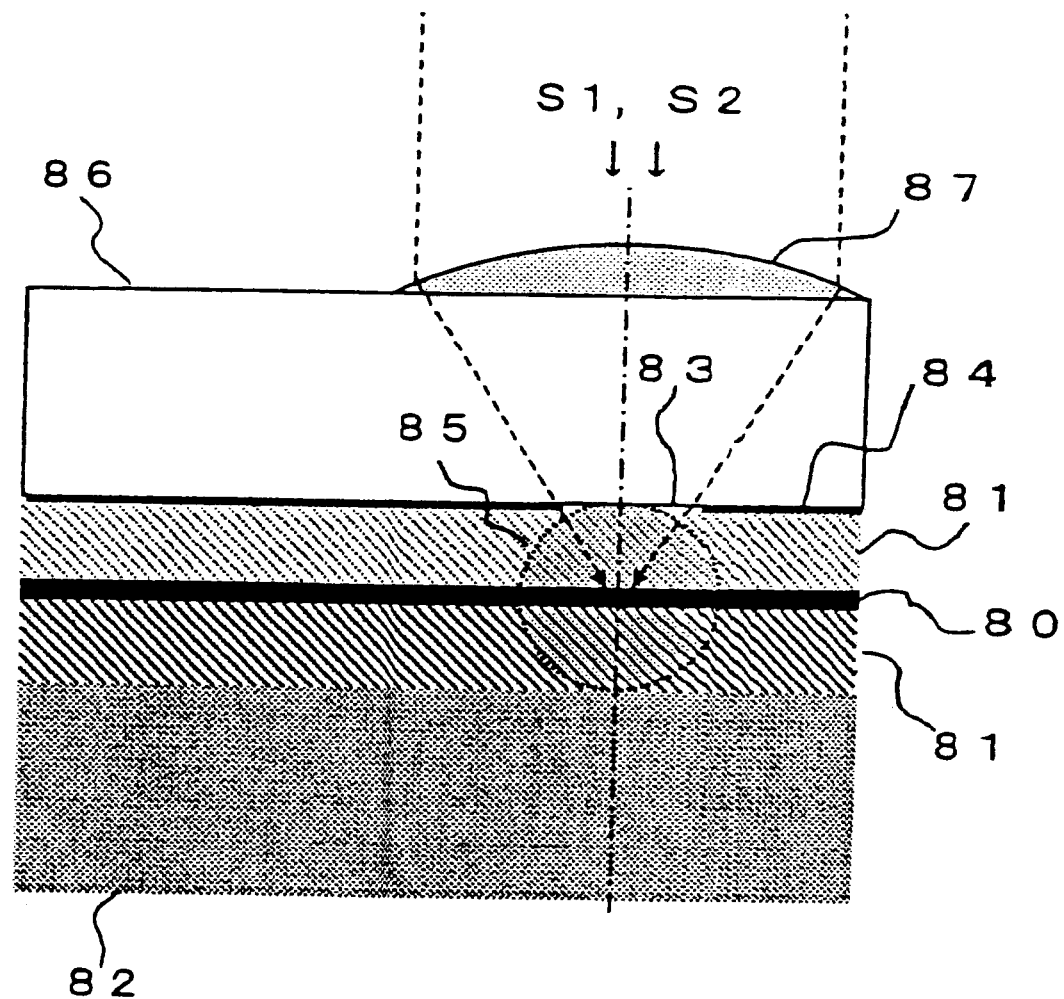
FIG. 16 is a sectional view showing a typical construction of the optical element according to this invention.

A sectional view illustrating the structure of the optical element of this invention is shown in FIG. 16. As shown in FIG. 16, from the incidence side of a control light S1 and signal light S2, the optical element is laminated in the following sequence: convex lens 87/light transmitting film 86/reflecting film 84 with apertures 83/heat insulation film 81/light absorption film 80/heat insulation film 81/heat transfer film 82.

The materials, manufacturing techniques, film thicknesses of the light absorption film, heat insulation film, heat transfer film and light reflection film, and the size of the apertures in the reflecting film, will now be described in order.

[Material of Light Absorption Film]

Various materials known in the art may be used as the material of the light absorption film in the optical element according to this invention.

When the optical element of this invention has a single layer structure comprising a light absorption film alone, the light absorption film must be a self-supporting type material. Here, a self-supporting material means a material that can maintain its shape (thin film) as an optical element without a support means. For example, if it is an inorganic glass material, an optical element of several $\mu$m thickness and several mm angle may be made "self-supporting". On the other hand, when forming a light absorption film with a thickness of several $\mu$m using a material such as polymethylmethacrylate containing coloring matter, a certain support means is required. In such a case, a heat transfer film which for example comprises an inorganic glass material must be used in conjunction to function also as a support means, as described later.

Even if the optical element of this invention is a laminar type structure, there is more freedom in the design of the structure of the optical element provided that the light absorption material itself has self-supporting properties. On the other hand, if the heat insulation film and/or heat transfer film that are described later are self-supporting, there is no need for the light absorption film to be self-supporting.

Specific examples of materials having optical absorption properties which may be used for the light absorption film in the optical element of this invention are single crystals of compound semiconductors such as for example GaAs, GaAsP, GaAlAs, InP, InSb, InAs, PbTe, InGaAsP or ZnSe, dispersions of microparticles of the above-mentioned compound semiconductors in a matrix material, single crystals of metal halides (e.g. potassium bromide or sodium chloride) doped with dissimilar metal ions, dispersions of microparticles of metal halides (e.g. copper bromide, copper chloride or cobalt chloride) in a matrix material, single crystals of cadmium chalcogenides such as CdS, CdSe, CdSeS or CdSeT doped with dissimilar metal ions such as copper, dispersions of microparticles of these cadmium chalcogenides in a matrix material, single crystal thin films, polycrystalline thin films or porous thin films of semiconductors such as silicon, germanium, selenium or tellurium, dispersions of semiconductor microparticles such as silicon, germanium, selenium or tellurium in a matrix material, single crystals of precious stones doped with metal ions ("laser crystals") such as ruby, alexandrite, garnet, Nd:YAG, sapphire, Ti: sapphire and Nd:YLF, lithium niobate (LiNbO$_3$) doped with metal ions (e.g. ferrous ion), ferroelectric crystals such as LiB$_3$O$_5$, LiTaO$_3$, KTiOPO$_4$, KH$_2$PO$_4$, KNbO$_3$ and BaB$_2$O$_2$, quartz glass doped with metal ions (e.g. neodymium ions, erbium ions, etc.), soda glass, glass borosilicate, other glass, and solutions of dyes or dispersions of pigments in a matrix material.

A solution of a dye or dispersion of a pigment in a matrix material is especially suitable for the purposes of this invention since a wide range of matrix materials and dyes or pigments is available, and it allows easy fabrication of the optical element.

Examples of dyes and pigments which can be used by this invention are xanthene dyes such as rhodamine B, rhodamine 6G, eosine and phloxine B; acridine dyes such as acridine orange and acridine red, azo dyes such as ethyl red and methyl red; porphyrin dyes; phthalocyanine pigments; cyanine dyes such as 3,3'-diethylthiacarbocyanin iodide and 3,3'-diethyloxadicarbocyanin iodide, and triarylmethane dyes such as ethyl violet and Victoria Blue R.

In this invention, these dyes and pigments may be used alone or two or more types may be mixed together and used concurrently.

Matrix materials that can be used in this invention may be any matrix materials provided they have the following characteristics:

(1) high transmissivity in the wavelength region of the light used in the optical control method of this invention, (2) ability to stably dissolve or disperse pigments or various microparticles used in this invention, (3) self-supporting properties if necessary.

Inorganic matrices that may be used comprise, for example, single crystals of metal halides, single crystals of metal oxides, single crystals of metal chalcogenides, fused quartz, soda glass, glass borosilicate and low melting point glass materials manufactured by the sol-gel method.

Organic matrices that may be used comprise, for example, various organic polymer materials.

To dissolve or disperse a pigment in these matrix materials, known methods may be used. These include, for example, a method wherein, after dissolving the pigment and matrix material in a common solvent, the solvent is removed by evaporation; a method wherein the matrix material is formed after dissolving or dispersing the pigment in an inorganic matrix material starting solution preparing sol-gel technique; a method wherein the matrix material is formed by dissolving or dispersing the pigment in a monomer of an organic polymer type matrix material optionally using a solvent, and polymerizing or polycondensing the monomer to form the matrix material; and a method wherein the pigment and a thermoplastic organic polymer matrix material are dripped into an insoluble solvent, the precipitate produced is filtered and dried, and heat/fusion processing is performed. It is known that pigment molecules may be aggregated to form special associates, referred to as "H aggregates" and "J aggregates", by suitable combinations and processing of the pigment and matrix material, and the pigment molecules in the matrix material may be used under conditions in which these aggregate states or associates form.

Known methods can also be used to disperse various types of microparticles within these matrix materials. These include for example a method wherein the microparticles are dispersed in a solution of the matrix material or a solution of a precursor of the matrix material and the solvent is removed; a method wherein the microparticles are dispersed in a monomer of an organic polymer type matrix material together with a solvent optionally, and the monomer is polymerized or polycondensed to form the matrix material; a method wherein microparticles of cadmium sulfide, formed by dissolving or dispersing a metal salt such as for example cadmium perchlorate or gold chloride in an organic polymer matrix material and treating with hydrogen sulfide gas, or microparticles of gold formed by heat treatment, are deposited in a matrix material; chemical vapor deposition; and sputtering.

Additionally, in order to improve workability, stability and durability for use as an optical element, the light absorbing material used in this invention may comprise antioxidants, ultraviolet absorbing agents, singlet oxygen quenchers and dispersion agents as additives to the extent that they do not interfere with its functions.

[Material of Heat Insulation Film]

A gas, liquid or solid can be used as the material of the heat insulation film. When the film is not self-supporting, such as in the case where the material of the heat insulation film is a gas or liquid, the light absorption film and heat transfer film can be manufactured from a self-supporting material, a space corresponding to the thickness of the heat insulation film may be provided, and the heat insulation film provided by injecting the gas or liquid into this space. When the heat insulation film is a solid, it may be laminated on the light absorption film.

The thickness of the heat insulation film also depends on the type of material, but it may be in a range from several nm to several hundred $\mu$m, and more preferably in a range from several tens of nm to several tens of $\mu$m.

When a gas is used as the heat insulation film, in addition to air, inert gases such as nitrogen, helium, neon and argon may conveniently be used.

When a liquid is used as the heat insulation film, any desired liquid may be used provided that it is a material which has a heat transfer coefficient equal to or less than that of the optical absorbing film, provided that it transmits control light and signal light, and provided that it does not dissolve or corrode the material of the light absorption film. For example, when the light absorption film is formed from polymethylmethacrylate comprising a cyanine dye, liquid paraffin may be used.

When a solid is used as the heat insulation film, any desired solid may be used provided that it is a material which has a heat transfer coefficient equal to or less than that of the light absorption film, provided that it transmits control light and signal light, and provided that it does not react with the material of the light absorption film or of the heat insulation film. For example, when the light absorption film is formed from polymethylmethacrylate comprising a cyanine dye, polymethylmethacrylate not comprising a pigment, "heat transfer rate 0.15 $Wm^{-1}K^{-1}$ at 300K", may be used as the heat insulation film.

[Material of Heat Transfer Film]

The heat transfer film preferably has a heat transfer coefficient greater than that of the light absorption film, and any desired material may be used provided that it transmits the control light and signal light and does not react with the light absorption film or the heat insulation film. Suitable materials which may be used as that heat transfer film which have a high heat transfer coefficient and a low optical absorption in the wavelength band of visible light are, for example, diamond, (heat transfer coefficient 900 $Wm^{-1}K^{-1}$ at 300K), sapphire (heat transfer coefficient 46 $Wm^{-1}K^{-1}$ at 300K), quartz single crystals (heat transfer coefficient 10.4 $Wm^{-1}K^{-1}$ at 300K on c axis), fused quartz (heat transfer coefficient 1.38 $Wm^{-1}K^{-1}$ at 300K) and hard glass (heat transfer coefficient 1.10 $Wm^{-1}K^{-1}$ at 300K).

[Material of Light Reflecting Film]

Any desired material may be used as the light reflecting film provided that it transmits the control light and signal light and does not react with the materials of the light absorption film, the heat insulation film or the heat transfer film. Aluminum or gold metal foil, or dielectric multilayer films comprising alternating laminated films of titanium oxide and silicon oxide, are suitable for use.

[Material of Convex Lens]

In one form of the optical element according to this invention, a convex lens is laminated on the incidence side of the control light on the light transmitting film as a means of converging the control light. The material of this convex lens may be any material known in the art. For example, suitable materials are plastics such as polymethylmethacrylate type resins and optical glass.

[Material of Light Transmitting Film]

In one form of the optical element according to this invention, a convex lens is laminated on the incidence side of the control light on the light transmitting film as a means of converging the control light. The material of the light transmitting film may be identical to the material of the solid heat insulation film and/or heat transfer film.

[Method of Manufacturing Optical Element]

The method of manufacturing of the optical element of this invention is selected according to the construction and type of material used for the optical element, and any method known in the art may be used.

For example, when the material of the light absorption film used in the optical element comprises the single crystals mentioned here above, the light absorption film may be manufactured by cutting/polishing of a single crystal.

When preparing an optical element of a "light absorption film/heat transfer film" type laminar construction wherein the light absorption film is formed from a matrix material comprising a pigment, and the heat transfer film is formed from an optical glass, the light absorption film can be prepared by the following methods.

Coating techniques such as coating, blade coating, roll coating, spin coating, dipping and spray coating of a solution containing a pigment and matrix material on a glass plate used as a heat transfer film.

Printing techniques such as plate, embossed plate, letterpress, aperture plate, screen and transfer.

In this case, a method of manufacturing an inorganic matrix material by a sol-gel technique can also be used for the formation of a light absorption layer.

Electrochemical film-forming techniques, such as electro deposition, electrolytic polymerization and micelle electrolysis (Japanese Patent Laid-open publication No. Sho 63-243298), can be used.

The Langmuir-Blodgett technique that displaces a monomolecular film formed on water can also be used.

When the organic polymer tape matrix material which forms a light absorption film is thermoplastic, an optical element having a "heat transfer film/light absorption layer/heat transfer layer" structure can be prepared by the hot press method (Japanese Patent Laid-open publication No. Hei 4-99609) by incorporating a glass plate as heat transfer film.

If the monomer is a liquid, for example, methods of using a polymerization or polycondensation reaction of a starting material monomer include the casting method, reaction injection molding, plasma polymerization and photopolymerization.

Methods such as sublimation transfer, deposition, vacuum deposition, ion beam, sputtering, plasma polymerization, chemical vapor deposition and organic molecular beam deposition, can also be used.

A method of manufacturing a compound optical thin film (Japanese Patent No. 2599569) can be used wherein an organic optical material of two or more components is sprayed as a solution or a dispersion into a high vacuum container from a spray nozzle provided for each component, deposited on a substrate, and subjected to heat treatment.

The above methods of manufacturing a solid light absorption film may also conveniently be applied to, for example, a heat insulation film comprising a solid organic polymer material.

[Method of Providing Apertures in Light Reflecting Film]

One of the embodiments of the optical element according to this invention is characterized in comprising a light reflecting film having apertures of sufficient size for the above-mentioned converged, irradiated control light and signal light to pass, and any methods known in the art may be used to provide these apertures in the light reflecting film. For example, these apertures may be provided by coating a photoresist on a light reflecting film comprising a metal deposition film on a glass heat transfer film, and apertures provided by the technique of photo etching according to the usual method. The shape and size of the apertures will be described later.

[Calculation of Beam Waist Diameter]

Hereafter, the case will be described of a Gaussian beam wherein the amplitude distribution of the electric field of the advancing beam cross-section, i.e. the energy distribution of the light flux, is a Gaussian distribution. In addition, in the following description, the case is described where a condenser lens (convex lens) is used as a beam converging means, but the situation is the same even if the converging means is a concave mirror or a refractive index distribution lens.

Figure 3:
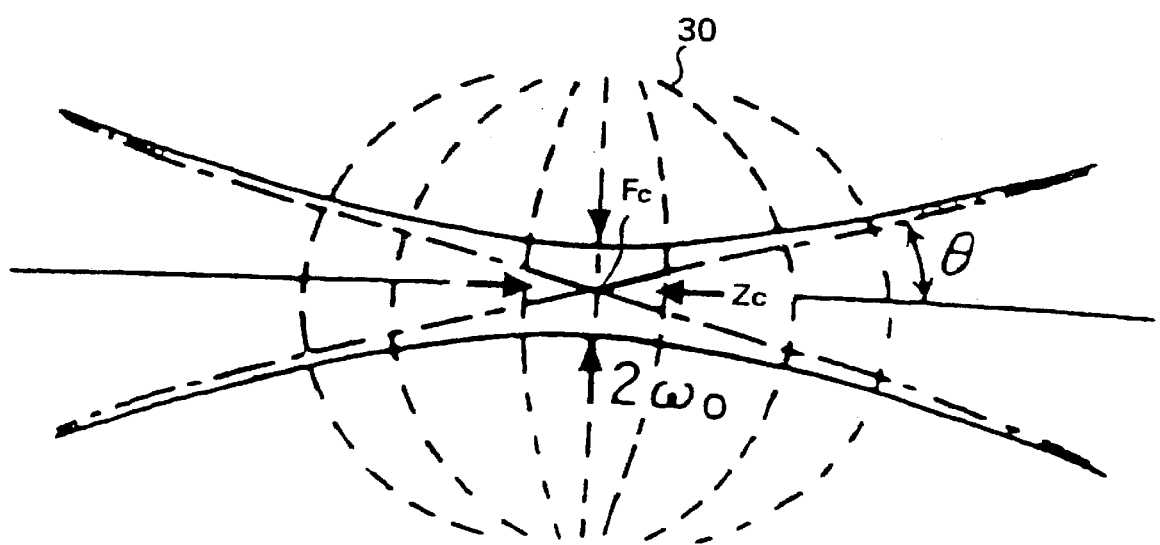

FIG. 3 shows the light flux and wavefront 30 in the vicinity of the focus Fc when a Gaussian beam is converged to a divergence angle of $2\theta$ by a condenser lens 7. Here, the position where the diameter $2\omega$ of a beam of wavelength $\lambda$ becomes a minimum is called the "beam waist." Hereafter, the beam waist diameter will be represented by $2\omega_0$. Due to diffraction, $2\omega_0$ is never zero and has a finite value. The beam radii $\omega$ and $\omega_0$ are defined as distances from the center of the beam where the energy becomes $1/e^2$ (e is the base of the natural logarithm), based on the energy at the center of a Gaussian beam. The photon density is of course a maximum at the center of the beam waist.

In the case of a Gaussian beam, the beam divergence angle $\theta$ at a sufficiently great distance from the beam waist is related to the wavelength $\lambda$ and the beam waist diameter $\omega_0$ by the following equation (2).

$$\pi \cdot \theta \cdot \omega_0 \approx \lambda \quad (2)$$

Here, $\pi$ is the circular constant.

Using this equation subject to the condition of "sufficiently far from the beam waist", the beam waist diameter $\omega_0$ condensed by the condenser lens can be calculated from the beam radius $\omega$ incident on the condenser lens, and the numerical aperture and focal length of the condenser lens.

Further, the beam waist diameter $2\omega_0$ when a parallel Gaussian beam (wavelength $\lambda$) having a beam radius $\omega$ is converged by a condenser lens of effective aperture radius a and numerical aperture NA can generally be expressed by the following equation (3).

$$2\omega_0 \approx K \cdot \lambda / NA \quad (3)$$

Here, as the coefficient K cannot be determined algebraically, it may be determined by performing a numerical analysis calculation of the photosignal intensity distribution on the lens-imaging surface.

When the ratio of the beam radius $\omega$ incident on the condenser lens and the effective aperture radius a of the condenser lens is varied, and a numerical analysis calculation is performed, the value of the coefficient K of equation (3) can be found as follows.

When $a/\omega=1$ $K \approx 0.92$

When $a/\omega=2$ $K \approx 1.3$

When $a/\omega=3$ $K \approx 1.9$

When $a/\omega=4$ $K \approx 3$

In other words, the more the beam radius $\omega$ is smaller than the effective aperture radius a of the condenser lens, the more the beam waist diameter $\omega_0$ increases.

For example, when a lens of focal length 6.2 mm, numerical aperture 0.65 and effective aperture radius of approx. 4 mm is used as condenser lens to converge a signal light of wavelength 694 nm, if the beam radius $\omega$ incident on the condenser lens is 4 mm, $a/\omega$ is approximately 1, and the beam waist radius $\omega_0$ is 0.49 $\mu$m. If $\omega$ is 1 mm, $a/\omega$ is approximately 4 and $\omega_0$ is 1.6 $\mu$m. Likewise, when a control light of wavelength 633 nm is converged, if the beam radius $\omega$ is 4 mm, $a/\omega$ is approximately 1 and the beam waist radius $\omega$ is 0.45 $\mu$m. If $\omega$ a is 1 mm, $a/\omega$ is approximately 4 and $\omega_0$ is 1.5 $\mu$m.

As can be understood from these example calculations, to minimize the cross-sectional area of the beam in the region where the photon density in the vicinity of the focus of the condenser lens is highest, i.e. the beam waist, the beam diameter should be expanded to the maximum at which the condenser lens can receive light (beam expansion). It is also seen that for the same beam diameter incident on the condenser lens, the beam waist diameter is smaller the shorter the wavelength of the light.

To increase the optical response in the light control method of this invention, it is desirable to set the shape and size of the beam cross-sections of the signal light and control light so that the beam cross-sectional area of the signal light in the region where the photon density in the vicinity of the focus is the highest, does not exceed the beam cross-sectional area of the control light in the region where the photon density in the vicinity of the focus is the highest. If Gaussian beams are used for the signal light and control light, according to the above description and equations, the beam cross-sectional area of the signal light in the region where the photon density in the vicinity of the focus is the highest can be prevented from exceeding the beam cross-sectional area of the control light in the region where the photon density in the vicinity of the focus is the highest, by suitably adjusting the beam diameters of the signal light and control light according to wavelength and performing beam expansion if necessary using a parallel beam before convergence by a condensing means such as a condenser lens. Beam expansion may be performed by a means known in the art such as a Kepler optical system comprising for example two convex lenses.

[Calculation of Confocal Length Zc]

As stated previously, in the case of a Gaussian beam, in the vicinity of the beam waist of the light flux converged by a condensing means such as a convex lens, i.e. within the interval of the confocal length Zc spanning the focus, the converged beam may be considered to be a substantially parallel light beam, and the confocal length Zc may be expressed by equation (1) using the circular constant $\pi$, beam waist radius $\omega$ and wavelength $\lambda$.

$$Zc = \pi \omega_0^2 / \lambda \quad (1)$$

Substituting $\omega_0$ of equation (1) into equation (3), equation (4) is obtained.

$$Zc \approx \pi (K/NA)^2 \lambda / 4 \quad (4)$$

The numerical aperture NA, effective aperture radius a and focal distance r may be found from equation (5).

$$NA = a/r \tag{5}$$

For example, when a lens of focal length 6.2 mm, numerical aperture 0.65 and effective aperture radius of approx. 4 mm is used as condenser lens to converge a signal light of wavelength 694 nm, if the beam radius ω incident on the condenser lens is 4 mm, a/ω is approximately 1, the beam waist radius $\omega_0$ is 0.49 μm and the confocal length Zc is 1.09 μm. If ω is 1 mm, a/ω is approximately 4, $\omega_0$ is 1.6 μm and the confocal length Zc is 11.6 μm. Likewise, when a control light of wavelength 633 nm is converged, if the beam radius ω is 4 mm, a/ω is approximately 1, the beam waist radiuse $\omega_0$ is 0.45 μm and the confocal length Zc is 0.996 μm . If ω is 1 mm, a/ω is approximately 4, $\omega_0$ is 1.5 μm and the confocal length Zc is 10.6 μm.

[Optimum Film Thickness of Light Absorption Film]

A sample was prepared, adjusting the pigment density and film thickness so that the product of the film thickness and pigment density was constant so as to achieve a constant optical density of the light absorption film. As a result of various experiments, it was found that a sufficiently fast optical response of the light control method of this invention could be obtained by setting twice the confocal length calculated as described above as an upper limit of the film thickness of the light absorption film.

Regarding the lower limit of the film thickness of the light absorption film, provided that an optical response can be detected, the thinner the film, the better.

[Film Thickness of Heat Insulation Film]

There are optimum values (a minimum value and a maximum value) of the film thickness of the heat insulation film which increase the magnitude and/or rapidity of the optical response of the heat insulation film. The values can be experimentally determined according to the composition of the optical element, the material and thickness of the light absorption film, the material of the heat insulation layer, and the material and thickness of the heat transfer film.

[Film Thickness of Heat Transfer Film]

There is also an optimum value (in this case, a minimum value) of the film thickness of the heat transfer film that increases the magnitude and/or rapidity of the optical response of the heat insulation film. The value can be experimentally determined according to the composition of the optical element, the material and thickness of the light absorption film, the material and thickness of the heat insulation layer, and the material of the heat transfer film.

[Function, Shape and Size of Apertures in Light Reflection Film]

In the optical element of this invention, when the heat insulation film and/or heat transfer film are present, adjustment of the optical axes of the converged, irradiated control light and signal light is simplified by providing the light reflecting film with apertures large enough for this control light and signal light to pass on the control light incidence side of the light absorption film via the heat insulation film and/or heat transfer film. The positions of the optical axes of the signal light and control light are optimized by a simple adjustment of the optical axes of the signal light and control light so that the amount of signal light and control light passing through the aperture is maximized in each case.

To the extent that the apertures fulfill their function, the shape and size of the apertures should be such as to effectively transmit the light flux of the signal light and control light. If the signal light and control light are Gaussian beams, the light flux cross-section is circular, and it is therefore desirable that the shape of the apertures is also circular. As for the radius of the circular apertures, it is desirable that this is equivalent to the beam radius of the signal light and control light passing through the apertures. It must be noted here that when the radius of the apertures is too small, interference of light becomes conspicuous. As a specific guideline, it is desirable that the diameter of the apertures is not less than 100 times the wavelength of the signal light and control light. Normally, since the signal light and control light having a diameter in the order of millimeters pass through the apertures after being "converged", the size of the apertures can be increased larger than the aforesaid value by adjusting the set position of the light reflecting film with the apertures.

[Method of Manufacturing Convex Lens]

One of the optical element embodiments of this invention is characterized in that a convex lens is laminated on the control light incidence side on the light transmitting film as a means of converging the control light. This convex lens is preferably manufactured by the method of this invention, however, any method known in the art may be used.

For example, a refractive index distribution type convex lens may be manufactured from an inorganic glass type material using an inorganic ion diffusion phenomenon [M. Oikawa, K. Iga: Appl. Opt., 21(6), 1052–1056(1982)]. A mask is attached to a glass substrate, a circular window of diameter approximately 100 μm is formed by photolithography, the assembly is immersed in a fused salt and a refractive index distribution is formed by ion exchange. This ion exchange is promoted by applying an electric field for several hours, and a lens of diameter 0.9 mm, focal length 2 mm and numerical aperture NA=0.23 is thereby formed.

In methods of this type, the "mask" used in forming the convex lens in the substrate may be used in conjunction with the "light reflecting film with apertures large enough for the converged, irradiated control light and signal light to pass" in the optical element of this invention.

[Material of Microlens]

As the material of the microlens in the method of manufacturing an optical element according to this invention, a thermoplastic polymer compound known in the art for its application to plastic micro lenses can be used.

[Material of Original Plate]

As the material of the original plate in the method of manufacturing an optical element according to this invention, a metal material suitable for the technique of photolithography can be used. For example, titanium, chromium and their alloys are suitable.

[Optical Functions]

In one embodiment of the optical element according to this invention, a convex lens is formed on a substrate, an optical function part is arranged at the focus of the convex lens, different types of light which are incident on the optical function part are each converged by the convex lens, and the light flux density is increased, therefore the light flux having increased density irradiates the optical function part. "Optical function" means any optical function known in the art, used either alone or in conjunction with another optical function. Examples of light-emitting phenomena which may be used are fluorescence, phosphorescence and heat-stimulated emission (stored light), changes in absorption spectra such as photochromism and light-stimulated thermochromism, (reversible) photochemical reactions such as photoisomerism, and phenomena such as photoexcited orientation changes of liquid crystals, phase changes, photoconduction phenomena, photoelectromotive force, thermal lens effects, absorption saturation, photorefractive phenomena and optical Kerr effects.

These phenomena may be applied as optical sensors. In this case, a sensor output can be extracted corresponding to each convex lens, and as the incident light is converged by each convex lens to irradiate the optical function part, high sensitivity sensing with a good signal/noise ratio can be performed.

Hereafter, specific embodiments of this invention will be described in detail with reference to the drawings.

[Embodiment 1]

A schematic view of an optical control device according to this embodiment is shown in FIG. 1.

The optical control device of this invention which is shown in outline in FIG. 1, comprises a control light source 1, a signal light source 2, an ND (neutral density) filter 3, a shutter 4, a half-transmitting mirror 5, a light mixing instrument 6, a condenser lens 7, an optical element 8 of this invention, a light receiving lens 9, a wavelength selection transmitting filter 20, a diaphragm 19, photodetectors 11 and 22, and an oscilloscope 100. Of these optical elements or optical parts, the control light source 1, signal light source 2, light mixing instrument 6, condenser lens 7, optical element 8, light receiving lens 9 and wavelength selection transmitting filter 20 are indispensable component elements for implementing the optical control method of this invention by the construction shown in FIG. 1. The ND filter 3, shutter 4 and half-transmitting mirror 5 are provided optionally, and although the photodetectors 11, 22 and oscilloscope 100 are not required to implement the control method of the invention, they are used as necessary electronic devices for confirming an optical control operation.

Next, the features and operation of each component element will be described.

A laser device may be used as the control light source 1. The oscillation wavelength and output are suitably selected according to the wavelength of the signal light which is the object of the optical control method of this invention, and according to the optical absorption properties of the light absorption film used. There is no particular restriction on the method of laser oscillation, and any method may be used depending on the oscillation wavelength band, output and economical efficiency, etc. The light of the laser light source may also be used after a wavelength transformation by a nonlinear optical element. Specifically, a gas laser such as an argon ion laser (oscillation wavelength 457.9 to 514.5 nm) or helium-neon laser (633 nm), a solid-state laser such as a ruby laser or Nd:YAG laser, a dye laser or a semiconductor laser may be used.

As the signal light source 2, not only coherent light from a laser light source but also non-coherent light may be used. Moreover, in addition to light sources which give monochromatic light such as laser devices, light-emitting diodes and neon discharge tubes, the continuous spectra from, for example, a tungsten filament lamp, metal halide lamp, or xenon discharge tube may be rendered monochromatic by an optical filter or monochromator.

Hereafter, an embodiment will be described where the light emitted from a semiconductor laser (oscillation wavelength 694 nm, continuous oscillation power 3 mW) as the signal light source 2 is beam-shaped to give a parallel Gaussian beam of diameter approximately 8 mm, and a helium-neon laser (oscillation wavelength 633 nm, collimated beam of beam diameter approximately 2 mm, wherein the beam cross-section energy distribution is a Gaussian distribution) is used as the control light source 1.

The ND filter 3 is not indispensable, but it is useful to avoid a laser light of higher power than necessary from being incident on the optical parts and optical elements comprising the device, and to adjust the photosignal intensity of the control light in performing tests of the optical response of the optical element of this invention. In this embodiment, several types of ND filters were used interchangeably for the latter object.

The shutter 4 is used to cause the continuous oscillation laser light used as control light to flash in a pulse-like fashion, but it is not indispensable to implementing the optical control method of this invention. When the control light source 1 is a laser which has a pulse oscillation, and is a light source of a type where the pulse width and oscillation interval can be controlled, or when a laser light which is previously pulse-modulated is used as the light source 1, the shutter 4 need not be provided.

When the shutter 4 is used, any type of shutter such as an optical chopper, mechanical shutter, liquid crystal shutter, optical Kerr effect shutter, Pockel cell or optoacoustic element may be conveniently selected from the viewpoint of the operating speed of the shutter itself.

According to this embodiment, the half-transmitting mirror 5 is used to constantly monitor the photosignal intensity of the control light in this embodiment when the operation of the control method of the invention is tested, and its light splitting ratio may be set as desired.

The photodetectors 11, 22 are used to electrically detect the way in which the photosignal intensity is changing due to the optical control of this invention, to verify it, and to examine the function of the optical element of this invention. The form of the photodetectors 11, 22 is arbitrary, and may be suitably selected from the viewpoint of the response speed of the detector itself. For example, a photomultiplier tube, photodiode or phototransistor may be used.

The light signal received by the photodetectors 11 and 22 may be monitored by the oscilloscope 100, or by a combination (not shown) of an A–D converter and a computer.

The light mixing instrument 6 is used to adjust the optical path of the control light and signal light which propagates inside the optical element, and it is an important component element in implementing the optical control method and optical control device of this invention. A polarized beam splitter, an unpolarized beam splitter or a dichroic mirror can be used, and the light splitting ratio may be set as desired.

The condenser lens 7, which is a common converging means for the signal light and control light, is used to converge the signal light and control light which have been adjusted so that their optical paths are identical, and irradiate the signal light and control light to the optical element. It is a component element indispensable to implementing the optical control method and optical control device of this invention. The lens specification, i.e. the focal length, numerical aperture, F value, lens composition and lens surface coating of the condenser lens, may be selected as desired.

In this embodiment, the case will be described where a microscope objective lens having a focal length of 6.2 mm, numerical aperture of 0.65 and effective aperture radius of 4.03 mm is used as the condenser lens 7.

The light beam radius $\omega_0$ in the region where the photon density is the highest in the vicinity of the focus of this condenser lens, i.e. in the beam waist, is 1.5 $\mu$m and the confocal length Zc is 10.6 $\mu$m for control light of wavelength 633 nm and beam diameter 2 mm as in the case of the typical calculations using eqn. (2) and eqn. (4) shown above.

Likewise, for signal light of wavelength 694 nm and beam diameter 8 mm, the light beam radius $\omega_0$ in the beam waist is 0.49 $\mu$m. In other words, the relation between the magnitudes of the control light and signal light beam in the beam waist is approximately 3:1 in terms of beam diameter and approximately 10:1 in terms of beam cross-sectional area, i.e., the control light is predominant.

Figure 4:
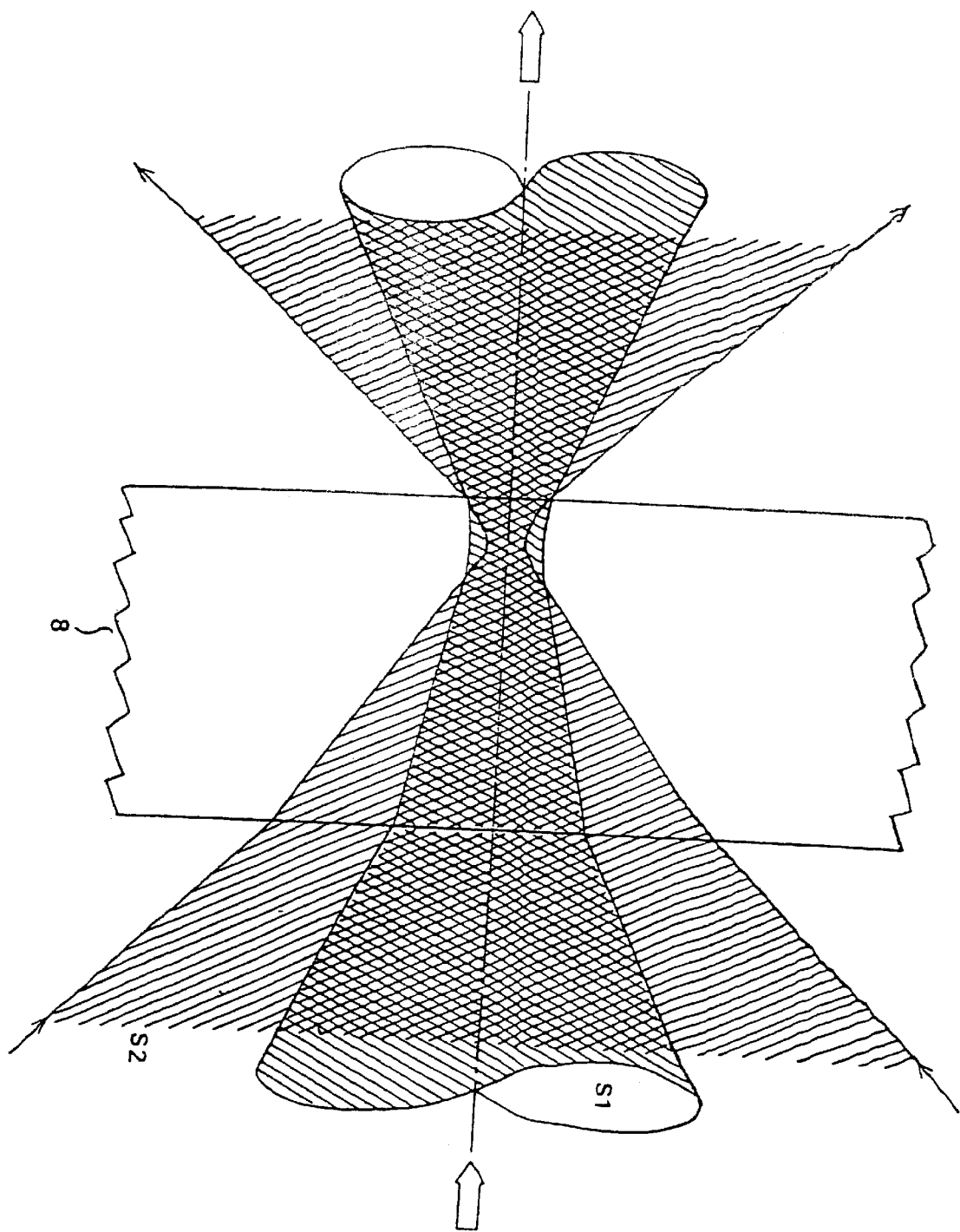
FIG. 4 is a figure schematically showing a relation between a signal light and a control light in an optical element.

The relation of the control light S1 and signal light S2 inside the optical element is schematically shown in FIG. 4.

Thus, by increasing the beam size of the control light compared with the signal light in the beam waist, it is easy to adjust the optical system so that the region in which the energy density of the control light converged beam in the vicinity of the focus of the condenser lens is highest, overlaps the region in which the energy density of the signal light converged beam is the highest, and the system is less susceptible to the effect of modifications of the optical system. Specifically, it is unnecessary for the centers of the optical axes of the control light and signal light to exactly coincide with one another, and the system can be adjusted so that the region in which the energy density of the signal light converged beam is the highest does not deviate from the region where the energy density of the control light converged beam is the highest even if the beam positions of the control light and signal light fluctuate or drift to some extent.

The light-receiving lens 9 is a means for restoring the signal light and control light which have converged, irradiated the optical element 8 and been transmitted through it, to parallel and/or converged beams, and to obtain a signal light of sufficient magnitude with good reproducibility, a lens of smaller aperture than the aperture of the condensing lens 7 is used. In this embodiment, a microscope lens of numerical aperture 0.4 was used as the light-receiving lens 9. By making the aperture of the light receiving lens 9 smaller than that of the condenser lens 7, that part of the signal light flux in a region strongly affected by photosignal intensity modulation and/or light flux density modulation can be separately extracted so that signal light of sufficient magnitude can be detected with good reproducibility. Even if the lens aperture is large, the aperture may be effectively reduced by inserting the diaphragm 19 causing only the center part of the light flux to be incident on the photodetector, but it is economical to use a light-receiving lens of small aperture. A concave mirror may also be used instead of the condenser lens and light-receiving lens.

The wavelength selection transmitting filter 20 is an indispensable component for implementing the optical control method of this invention shown in FIG. 1, and it is used as a means for extracting only the signal light from the signal light and control light which have propagated over the same optical path in the optical element.

As a means of separating the signal light and control light having different wavelengths, a prism, diffraction grating or dichroic mirror may also be used.

As wavelength selection-transmitting filter 20 used in the device of FIG. 1, any wavelength selection-transmitting filter known in the art may be used provided that it completely blocks light in the wavelength band of the control light, and efficiently transmits light in the wavelength band of the signal light. For example, plastic and glass colored with a pigment, or glass whereof the surface is coated with a dielectric multilayer deposition film can be used.

As one form of the optical element of this invention, a heat transfer film/light absorption film/heat transfer film type optical element 8 were prepared, for example, by the following procedure. 57.4 mg of the cyanine dye, 3,3'-diethyloxa-dicarbocyanine iodide (common name DODCI, Exciton Co.) and 1942.6 mg of poly(2-hydroxypropylmethacrylate) were dissolved in 200 ml acetone, the resulting solution was stirred into 600 ml n-hexane, the precipitate (dye and polymer mixture) which separated was filtered, washed with n-hexane and dried under reduced pressure, and the product was crushed. The dye and polymer powder mixture obtained was heated for two days at 100° C. under ultra high vacuum of less than $10^{-5}$ Pa, volatile components such as residual solvent were completely removed, and a powder of a dye/polymer mixture was thereby obtained. 20 mg of this powder was inserted between a slide glass (25 mm×76 mm×thickness 1.150 mm) used as heat transfer film and an identical cover glass (18 mm×18 mm×thickness 0.150 mm), and heated to 160° C. under vacuum. A light absorption film of 20 $\mu$m thickness was thereby prepared as a dye/polymer film between a slide glass/cover glass by nipping the two glass plates together under pressure (vacuum hot press method). The confocal length of the control light (wavelength 633 nm, beam diameter 2 mm) which was converged and irradiated to this light absorption film, was calculated to be 10.6 $\mu$m as described here above. In other words, the thickness of the above-mentioned light absorption film does not exceed twice the confocal length of the control light.

The dye density in the dye/polymer film was $6.26 \times 10^{-2}$ mol//l, taking the density of the dye/polymer mixture as 1.06.

The transmissivity spectrum of the optical element prepared as described above is shown in FIG. 2. The transmissivity of this film was 38.3% for the wavelength (633 nm) of the control light, and 90.3% for the wavelength (694 nm) of the signal light.

In the optical apparatus of FIG. 1 which comprises the above components, the optical beam of the control light emitted from the optical source 1 passes through the ND filter 3 for adjusting transmitted light intensity by adjusting transmissivity, passes through the shutter 4 for making the control light flash in a pulse-like fashion, and is split by the half-transmitting mirror 5.

Part of the control light split by the half-transmitting mirror 5 is received by the photodetector 11. Here, if the relation between the photosignal intensity in the light beam irradiation position to the optical element 8 and the photosignal intensity of the photodetector 11 is previously measured in the state where the optical source 2 is OFF, the optical source 1 is ON and the shutter 4 is open, and a calibration curve is prepared, the photosignal intensity of the control light incident on the optical element 8 can always be estimated from the photosignal strength of the photodetector 11. In this embodiment, the power of the control light-incident on the optical element 8 was adjusted to be from 0.5 mW to 25 mW by the ND filter 3.

The control light split and reflected by the half-transmitting mirror 5 passes through the light mixing instrument 6 and the condenser lens 7, and is converged and irradiated to the optical element 8. The control light beam that has passed through the optical element 8, passes through the light-receiving lens 9, and is blocked by the wavelength selection-transmitting filter 20.

The signal light beam emitted from the optical source 2 is mixed by the light mixing instrument 6 so as to follow the same optical path as the control light, passes through the condenser lens 7, and is thereby converged and irradiated to the optical element 8. After the light that passed through the element has passed through the light receiving lens 9 and the wavelength selection-transmitting filter 20, it is received by the photodetector 22.

Figure 5:
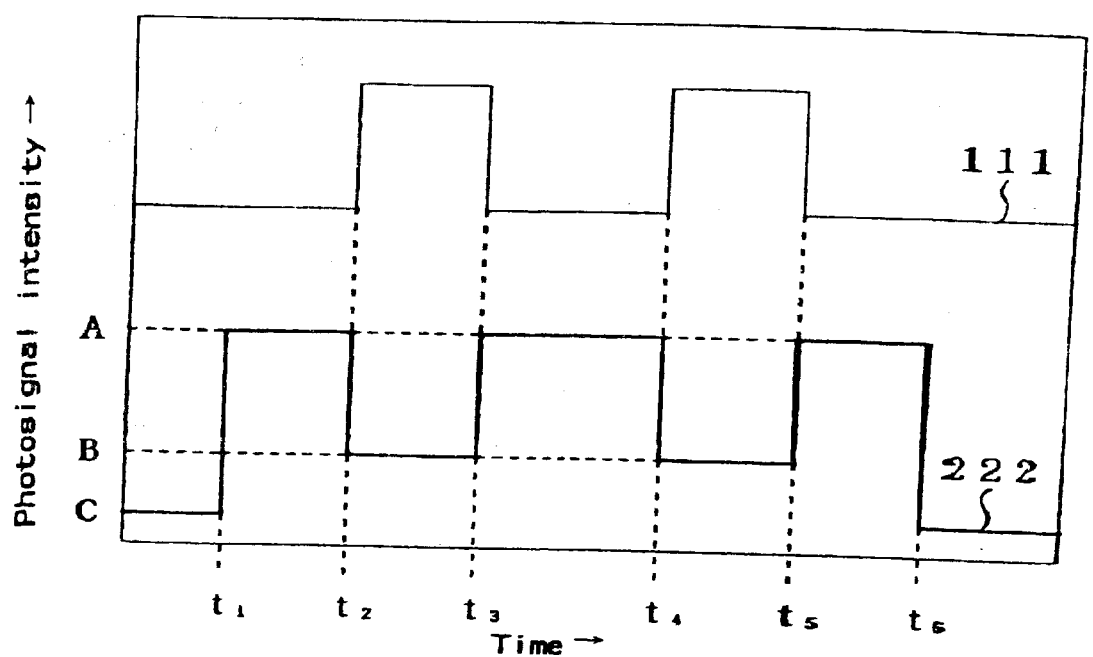
FIG. 5 is a figure showing a photosignal intensity time variation of the control light and signal light when setting a minimum convergence beam diameter position near a condenser lens of an optical element.
Figure 6:
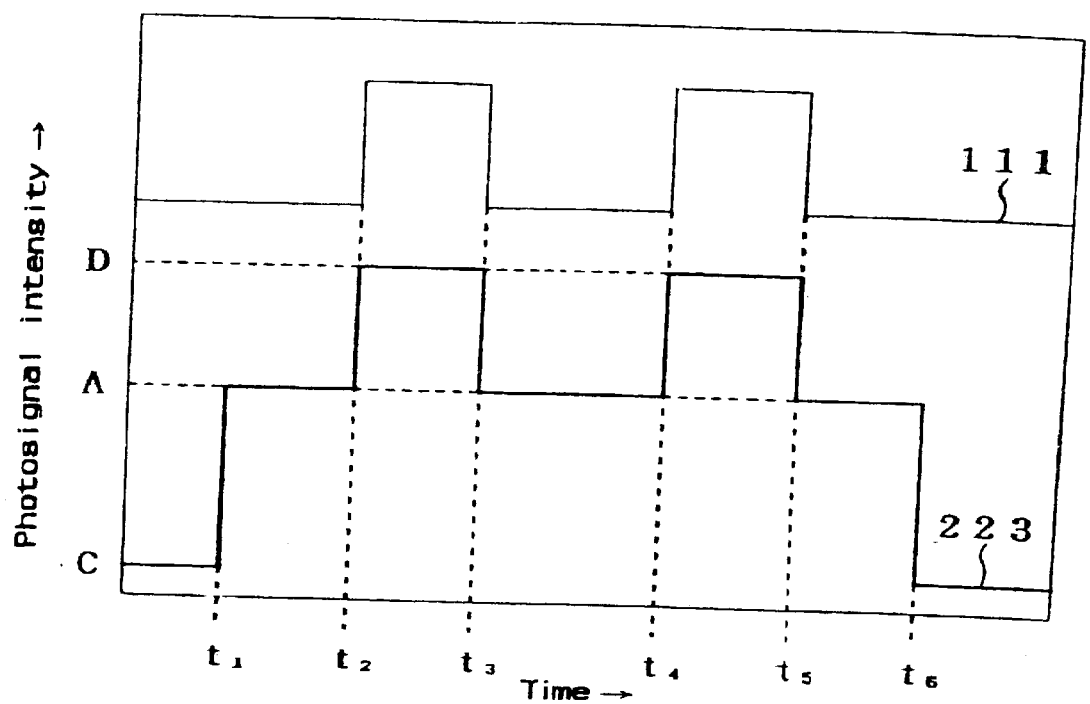
FIG. 6 is a diagram showing a photosignal intensity time variation of the control light and signal light when setting a minimum convergence beam diameter position near a receiving lens of an optical element.

A test of optical control was performed using the optical device of FIG. 1, and the photosignal intensity variation shown in FIG. 5 or 6 was observed. 111 is the light receiving signal of the photodetector 11, and 222 and 223 are the light receiving signals of the photodetector 22 in FIG. 5 and/or FIG. 6. The differences between receiving the light receiving signals 222 and 223 from the photodetector 22 are as follows.

In the device of FIG. 1, the control light and signal light are converged and arranged to be incident to the optical element 8. If the minimum converged beam diameter position, i.e. the beam waist (focus) is set at a position near the condenser lens 7 of the optical element 8 (light incidence side), the optical response 222 in a direction in which the signal light which has passed through the optical element decreases, is observed. Conversely, when the beam waist is set at a position near the light receiving lens 9 of the optical element 8 (light emitting side), the optical response 223 in a direction in which the apparent intensity of the signal light which has passed through the optical element increases, is observed.

The mechanism whereby such an optical response is produced is assumed to be as follows.

When the control light of wavelength selected from the wavelength region which the above-mentioned light absorption film absorbs is converged and irradiated to the optical element comprising the light absorption film by the condenser lens 7, the control light is absorbed by the light absorption film, a part of the absorbed optical energy changes to heat energy, the temperature of the control light irradiation part of the light absorption film rises, and the temperature of the peripheral region which subsequently absorbs the control light by heat conduction also rises. When a Gaussian beam is used as the control light, the distribution of the temperature rising is expected to be similar to a Gaussian distribution which becomes larger in the center of the beam and progressively decreases towards the outside. Due to this temperature rise and distribution, thermal expansion occurs in the above-mentioned control light irradiation part of the light absorption film, and, as a result, a density and refractive index variation with this distribution arises. The optical effect based on this refractive index distribution may be referred to as a "thermal lens." When irradiation of the control light that caused the thermal lens is stopped, the temperature rising due to light absorption stops, the density variation and refractive index distribution disappear, and the thermal lens is destroyed. In other words, the thermal lens is reversibly created and destroyed corresponding to the intermittence of the control light.

Now, considering the thermal lens formed by heat absorption when parallel control light which is not converged (Gaussian beam) is transmitted through a relatively thin light absorption film, the temperature rise is larger, the thermal expansion is larger and the density drop is larger near the beam center. As a result, a distribution is formed where the refractive index is smaller the nearer the center, and the optical effect may be considered to be equivalent to that of a concave lens. It may be conjectured that, regarding the optical effect of the thermal lens formed when converged control light is transmitted through a comparatively thick light absorption layer, the energy distribution of the beam cross-section will deviate from a Gaussian distribution due to the effect of light absorption, and a simple concave lens will not necessarily be formed.

In this regard, the photosignal intensity distribution in the cross-section of the signal light beam that was transmitted through the optical element, and its variation, were measured. In the following measurements, to move the position of the beam waist (focus Fc) of a converging beam within the optical element 8, the optical element 8 was displaced while the interval ($d_{78}+d_{89}$) between the condenser lens 7 and the light receiving lens 9 was fixed. In other words, the distance between the optical element 8 and condenser lens 7 was varied while the interval between the condenser lens 7 and light-receiving lens 9 was fixed, and the positional relation between the foci of the converged control light and signal light on the same optical path, and the optical element 8, was varied.

Figure 7:
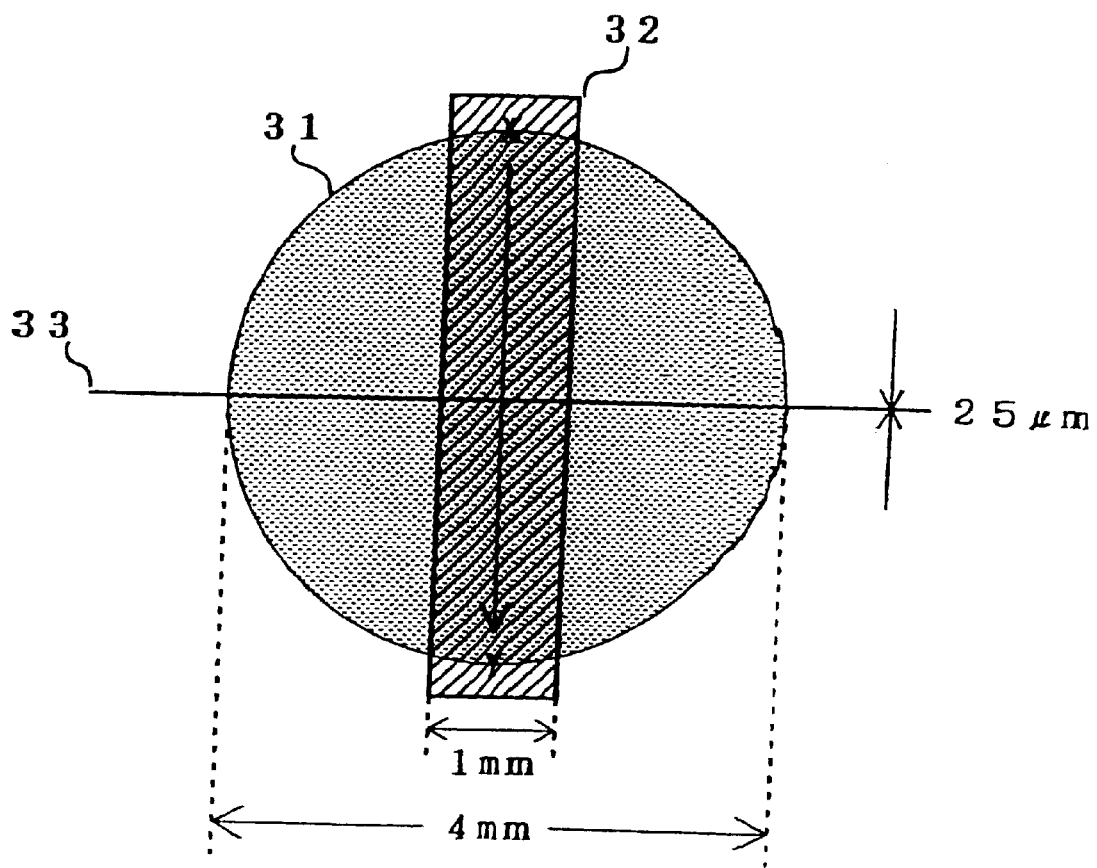
FIG. 7 is a diagram showing a relation of a slit and an optical beam used for photosignal intensity distribution measurement.
Figure 8:
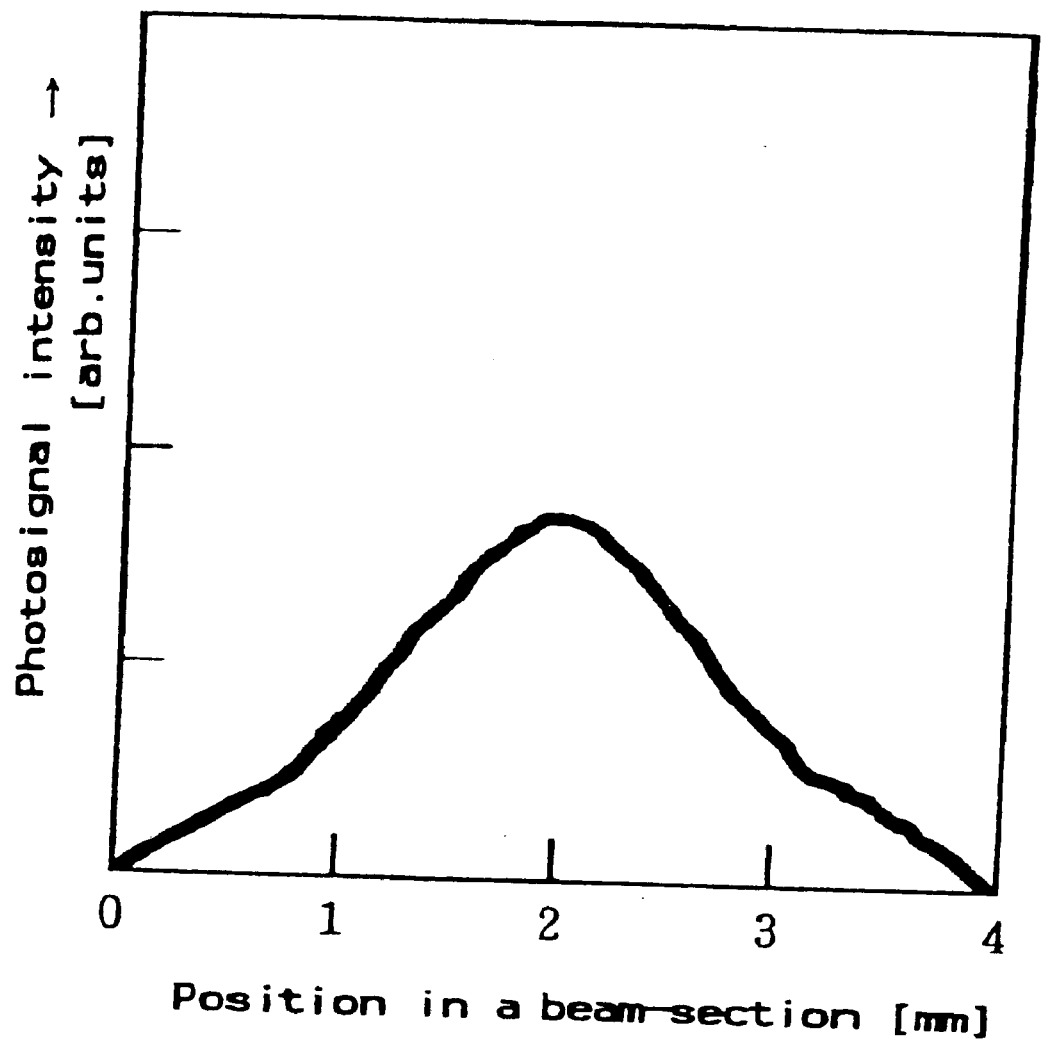
FIG. 8 is a diagram showing the photosignal intensity distribution of a beam section of the signal light.
Figure 9:
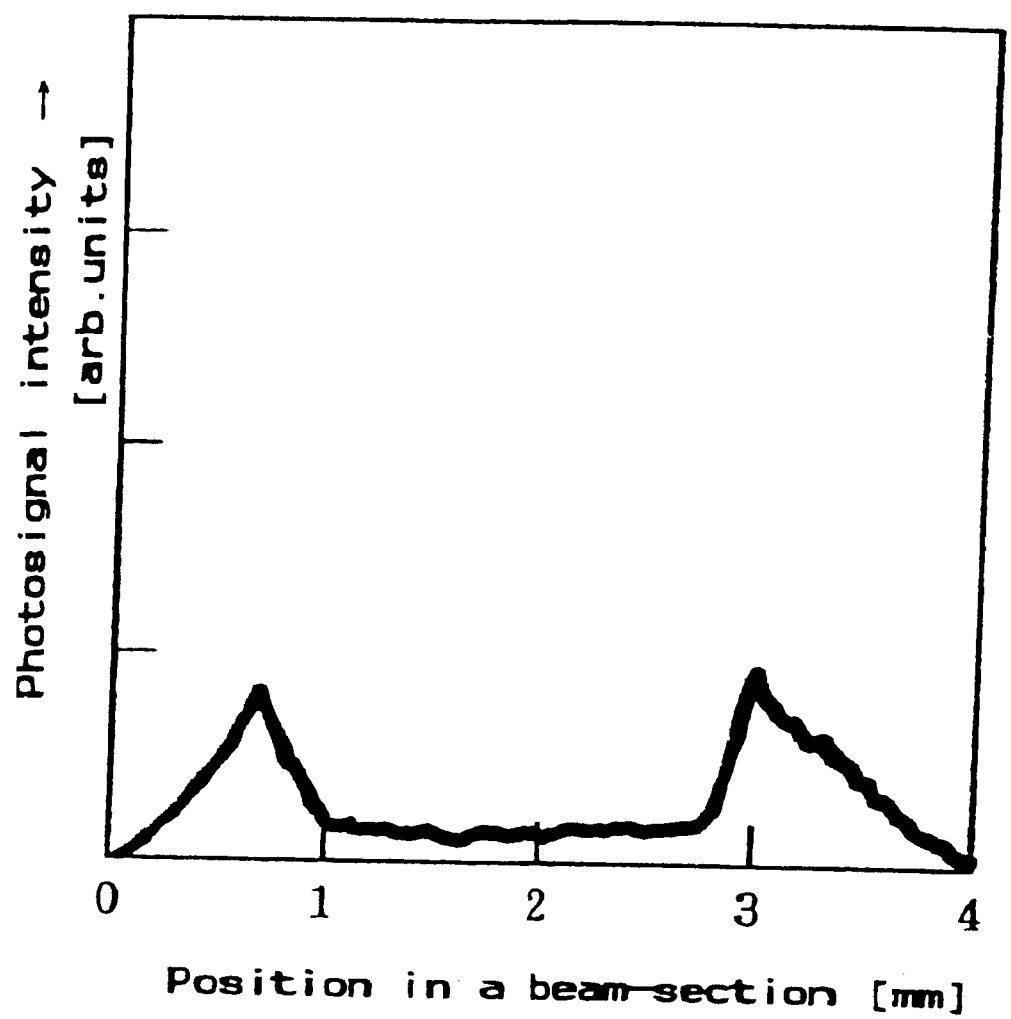
FIG. 9 is a diagram showing the photosignal intensity distribution of a beam section of the signal light.
Figure 10:
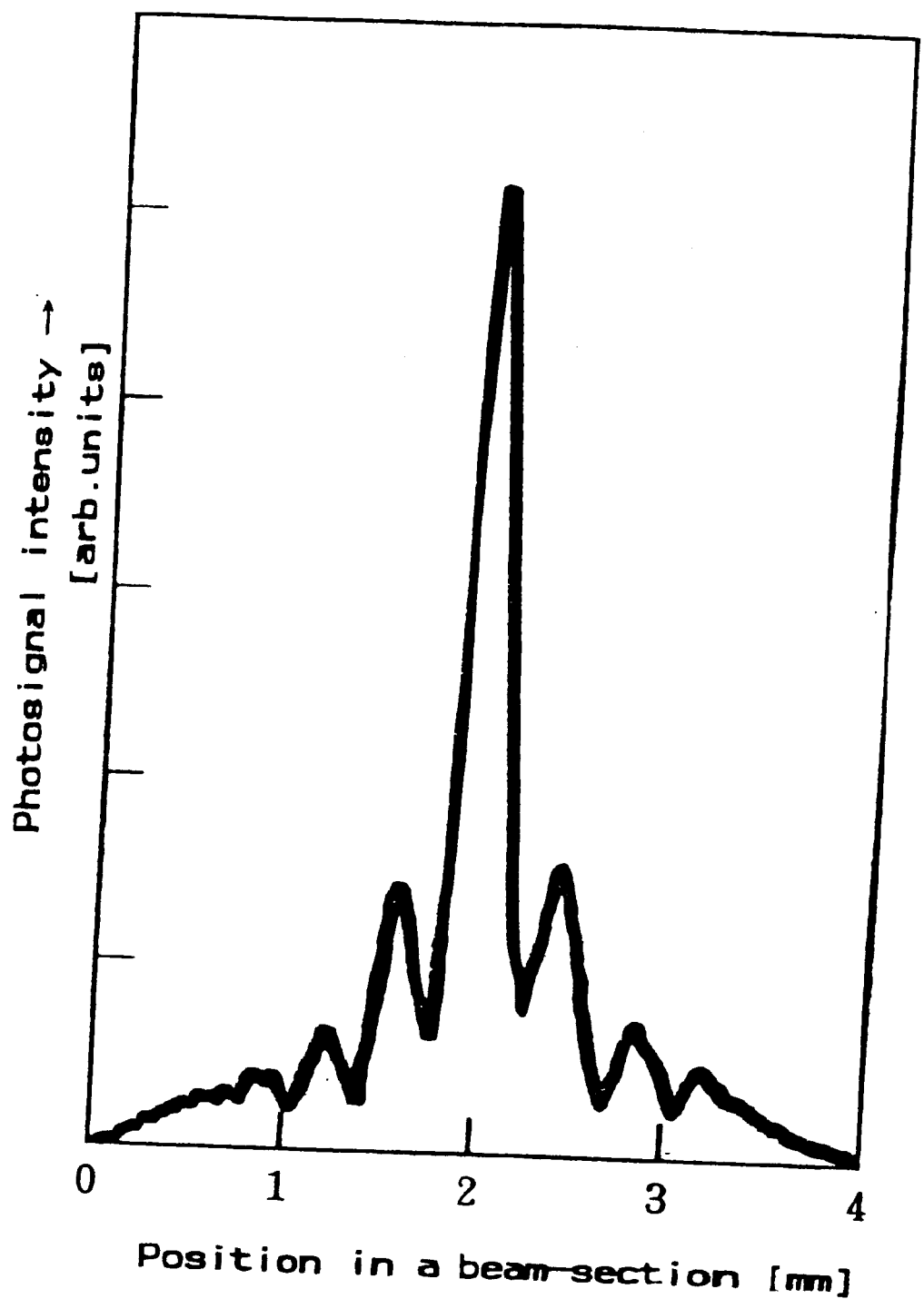
FIG. 10 is a diagram showing the photosignal intensity distribution of a beam section of the signal light.

In the device of FIG. 1, the light-receiving lens 9 was changed to a larger numerical aperture (e.g. 0.75) than that of the condenser lens 7 (0.65 in the case of this embodiment). Instead of the photodetector 22, a photointensity distribution measuring instrument provided with a slit as shown in FIG. 7 was installed, all the light flux transmitted through the optical element 8 was received and converged by the light receiving lens 9 and arranged to be incident on a light receiving part 31 (effective diameter 4 mm) of the photosignal intensity distribution measuring instrument, and the photosignal intensity distribution of a signal light pencil cross-section was measured. The measurement result is shown in FIGS. 8 to 10. As shown in FIG. 7, the photosignal intensity distribution measuring instrument is an instrument provided with a first slit 32 of width 1 mm and a second slit 33 of width 25 $\mu$m which moves in the length direction of the first slit, i.e. from a point X to a point Y in FIG. 7, at a fixed speed relative to the light receiving part 31 (effective diameter 4 mm), and measures the photosignal intensity of the light which has passed through a 1 mm×25 $\mu$m rectangular window formed by the two slits corresponding to the displacement position of the window. To measure the photosignal intensity corresponding to the displacement position of the window, the output of the detector which receives the light transmitted through the window may be recorded by, for example, a storage oscilloscope synchronized with the shift speed of the second slit 33. FIGS. 8 to 10 show the photosignal intensity distribution of an optical beam cross-section of signal light recorded by the storage oscilloscope as described above. The horizontal axis (position in the beam cross-section) corresponds to a position in a direction from point X to point Y in FIG. 7, and the vertical axis represents photosignal intensity.

FIG. 8 is the photosignal intensity distribution when the control light is not incident, and only the signal light is incident on the optical element 8. The photosignal intensity distribution in this case is a distribution where the intensity of the center part is high, and gradually decreases towards the periphery (Gaussian distribution).

FIG. 9 is the photosignal intensity distribution of the signal beam crosssection when the control light is irradiated, under conditions when the beam waist position (focus Fc) of the control light and signal light is set at a position near the condenser lens 7 of the optical element 8 (light incidence side), and the optical response 222 is observed in a direction in which the apparent signal light intensity decreases when the control light is irradiated.

In this case, the photosignal intensity distribution is weak in the center, and increases at the periphery. The photosignal intensity in the center of the signal light beam cross-section decreases depending on the control light intensity and the positional relation of the optical element 8 and the foci, and approaches zero as the control light intensity increases. It would appear that the refractive index becomes smaller the nearer the center due to irradiation by the control light, and the light in this area is bent in the circumferential direction of the beam. In this case therefore, by extracting only the center part of the signal light beam and measuring the apparent signal light intensity, the optical response 222 in the direction in which the intensity of the signal light decreases correspondingly to the intermittence of the control light can be extracted with a sufficient magnitude.

FIG. 10 is the photosignal intensity distribution of the signal beam crosssection when the control light is irradiated, under conditions when the beam waist position (focus Fc) of the control light and signal light is set at a position near the light receiving lens 9 of the optical element 8 (light emitting side), and the optical response 223 is observed in a direction in which the apparent signal light intensity increases when the control light is irradiated. In this case, the photosignal intensity in the center is stronger than the photosignal intensity in the center when the control light is not irradiated (FIG. 8). Here, the photosignal intensity of the center part of the signal light beam cross-section depends on the control light intensity and the relation of the optical element 8 to the position of the focus, and it attains several times the intensity when the control light is not irradiated. This may be because, in this arrangement, the optical effect of the thermal lens formed by the converged, irradiated control light is to project the convergence point of the signal light which has been converged and irradiated in the same way, outside the optical element 8 (it may project it to infinity depending on the conditions). In this case therefore, by extracting only the center part of the signal light beam and measuring the apparent signal light intensity, the optical response 223 in the direction in which the intensity of the signal light increases correspondingly to the intermittence of the control light can be extracted with sufficient magnitude.

If the numerical aperture of the light receiving lens 9 is made larger than that of the condenser lens 7, and all the signal light that has passed through the optical element lens is received, the optical response is small or effectively zero even if signal light having the above intensity distribution is arranged to be incident on the photodetector 22. In other words, the optical response is small or effectively zero whether the control light and signal light are converged and arranged to be incident on the condenser lens side of the optical element 8 or whether the control light and signal light are converged and arranged to be incident on the light receiving lens side of the optical element 8. This suggests that absorption from the excited state of the dye in the optical element is actually not occurring.

On the other hand, if the numerical aperture of the light-receiving lens 9 is made smaller than that of the condenser lens 7 as shown in FIG. 1 of this embodiment, the outer circumferential part of the signal light incident on the photodetector 22 is cut off. When the control light and signal light are converged and arranged to be incident on the condenser lens side (incidence side) of the optical element 8, the signal light incident on the photodetector 22 decreases, and when the control light and signal light are converged and arranged to be incident on the light receiving lens side (emitting side), the signal light incident on the photodetector 22 increases and a large optical response is obtained.

A test of the control light was performed using the optical device of FIG. 1, and the photosignal intensity variation shown in FIG. 5 or 6 was measured. The details are as follows.

First, the optical paths from each light source, the light mixing instrument 6 and the condenser lens 7 were adjusted so that the optical beam of the control light and the optical beam of the signal light were brought to a focus Fc in the same area inside the optical element 8. The signal light and control light were arranged to be incident from the cover glass side of the optical element 8, and the optical element was arranged so that they emitted from the slide glass substrate side. Next, the function of the wavelength selection filter 20 was checked. Specifically, the light source 2 was switched off, the light source 1 was switched on, and it was confirmed that there was no response at all in the photodetector 22 when the shutter 4 was opened and closed.

First, referring to FIG. 5, the case will be described where the focus Fc was arranged on the condenser lens side (incidence side) of the optical element 8.

When the control light source 1 was switched on with the shutter 4 closed, and the signal light source 2 was switched on at a time $t_1$ to irradiate the optical element 8, the signal intensity of the photodetector 22 increased from level C to level A.

When the shutter 4 was opened at a time $t_2$, and the control light was converged and irradiated to the same optical path as the signal light inside the optical element 8, the signal intensity of the photodetector 22 decreased from level A to level B. The response time of this change was less than 2 microseconds.

When the shutter 4 was closed at a time $t_3$ and irradiation of the control light to the optical element was stopped, the signal intensity of the photodetector 22 returned from level B to level A. The response time of this change was less than 3 microseconds.

When the shutter 4 was opened at a time $t_4$ and subsequently closed at a time $t_5$, the signal strength of the photodetector 22 decreased from level A to level B, and subsequently returned to level A.

When the source 2 was switched off at a time $t_6$, the output of the photodetector 22 declined and returned to level C.

Next, referring to FIG. 6, the case will be described where the focus Fc was arranged on the receiving lens side (emitting side) of the optical element 8.

When the control light source 1 was switched on with the shutter 4 closed, and the signal light source 2 was switched on at a time $t_1$ to irradiate the optical element 8, the signal intensity of the photodetector 22 increased from level C to level A.

When the shutter 4 was opened at a time $t_2$, and the control light was converged and irradiated to the same optical path as the signal light inside the optical element 8, the signal intensity of the photodetector 22 increased from level A to level D. The response time of this change was less than 2 microseconds.

When the shutter 4 was closed at a time $t_3$ and irradiation of the control light to the optical element was stopped, the signal intensity of the photodetector 22 returned from level D to level A. The response time of this change was less than 3 microseconds.

When the shutter 4 was opened at a time $t_4$ and subsequently closed at a time $t_5$, the signal strength of the photodetector 22 increased from level A to level D, and subsequently returned to level A.

When the source 2 was switched off at a time $t_6$, the output of the photodetector 22 declined and returned to level C.

Summarizing the above, when the control light having a time variation of photosignal intensity represented by a waveform shown by 111 in FIG. 5 was irradiated to the optical element 8, the output waveform of the photodetector 22 which monitors the photosignal intensity of the signal light reversibly changed corresponding to the time variation of the photosignal intensity of the control light, as shown by 222 or 223 of FIG. 5 or 6. In other words, it was confirmed that transmission of the signal light could be controlled by increasing and decreasing the control light photosignal intensity, or switching the latter on and off, that light could be controlled by light (light/light control), and that light could be modulated by light (light/light modulation).

The extent of variation of the signal light photosignal intensity corresponding to the intermittence of the control light may be quantitatively compared by a value ΔT [units %] defined below using the output levels A, B and C of the photodetector 22, or a value ΔT' [units %] which is defined below using A, C and D.

$$\Delta T = 100[(A-B)/(A-C)]$$

$$\Delta T' = 100[(D-A)/(A-C)]$$

A is the output level of the photodetector 22 when the signal light source 2 is switched on and the control light is shut off. B and D are the output levels of the photodetector 22 when the signal light and control light are simultaneously irradiated. C is the output level of the photodetector 22 when the signal light source 2 is switched off.

In the above example, the incidence power of the control light was set to 20 mW, and the direction and magnitude of the optical response of the signal light was investigated when the position of the optical element 8 was displaced. The maximum value of ΔT of the response in the direction in which the signal light intensity decreases was 80%, and the maximum value of ΔT' of the response in the direction in which the apparent signal light intensity increases was 40%.

[Embodiment 2]

Next, the optical density of the light absorption film was fixed, and an experiment was performed varying the dye density and film thickness of the light absorption film.

First, when the dye density of the light absorption film used in Embodiment 1 was doubled and the film thickness of the light absorption film was set to 10 μm, which was half that in the case of Embodiment 1, the magnitudes of ΔT and ΔT' of the optical response were almost the same as that of the case of Embodiment 1.

COMPARATIVE EXAMPLE 1

An optical element was manufactured wherein the dye density of the light absorption film in the optical element of Embodiment 1 was halved, and the film thickness of the light absorption film was set to 40 μm, i.e. twice the original film thickness. When an optical response test was performed, the maximum of ΔT was 68% and the maximum of ΔT' was 25%. Compared with the case of Embodiment 1, the magnitude of the optical response clearly decreased. It may be conjectured that this is because the thickness of the light absorption film exceeds twice the confocal length of the control light, and the dye is diluted compared to the case of Embodiment 1, hence, formation of the thermal lens due to absorption of control light is impeded more than in the case of Embodiment 1.

COMPARATIVE EXAMPLE 2

An optical element was manufactured without changing the dye density in the light absorption film of the optical element of Embodiment 1, and changing only the thickness of the light absorption film to 40 μm, i.e. twice the original thickness. When an optical response test was performed, the maximum values of ΔT and ΔT' were not inferior to the case of Embodiment 1, but the absolute value of signal light transmissivity remarkably decreased, and the signal/noise ratio for a high-speed response worsened.

[Embodiment 3]

Using the method of manufacturing a composite optical thin film described in Japanese Patent No. 2599569, (i) a heat insulation film comprising only poly(2-hydroxypropylmethacrylate)

(ii) a light absorption film comprising DODCI as dye and poly(2-hydroxypropylmethacrylate) as matrix resin wherein the dye density of the dye/polymer film was adjusted to $1.25 \times 10^{-1}$ mol/l, and (iii) a heat insulation film comprising only poly(2-hydroxypropylmethacrylate) (film thickness 10 μm)

were laminated or deposited on a slide glass (25 mm×76 mm×thickness 1.150 mm) as a heat transfer film, a cover glass (18 mm×18 mm×thickness 0.150 mm) was superimposed as a heat transfer film, and the assembly was subjected to heat and pressure under vacuum (vacuum hot pressing) to give a "heat transfer film/heat insulation film/light absorption film/heat insulation film/heat transfer film" as one form of the optical element of this invention.

The film-forming conditions were adjusted so that the thicknesses of the two heat transfer films (glass plates) were as described above, the thicknesses of the two heat insulation films were both 10 μm after vacuum hot pressing, and the thickness of the light absorption film was 10 μm after vacuum hot pressing.

Figure 2:
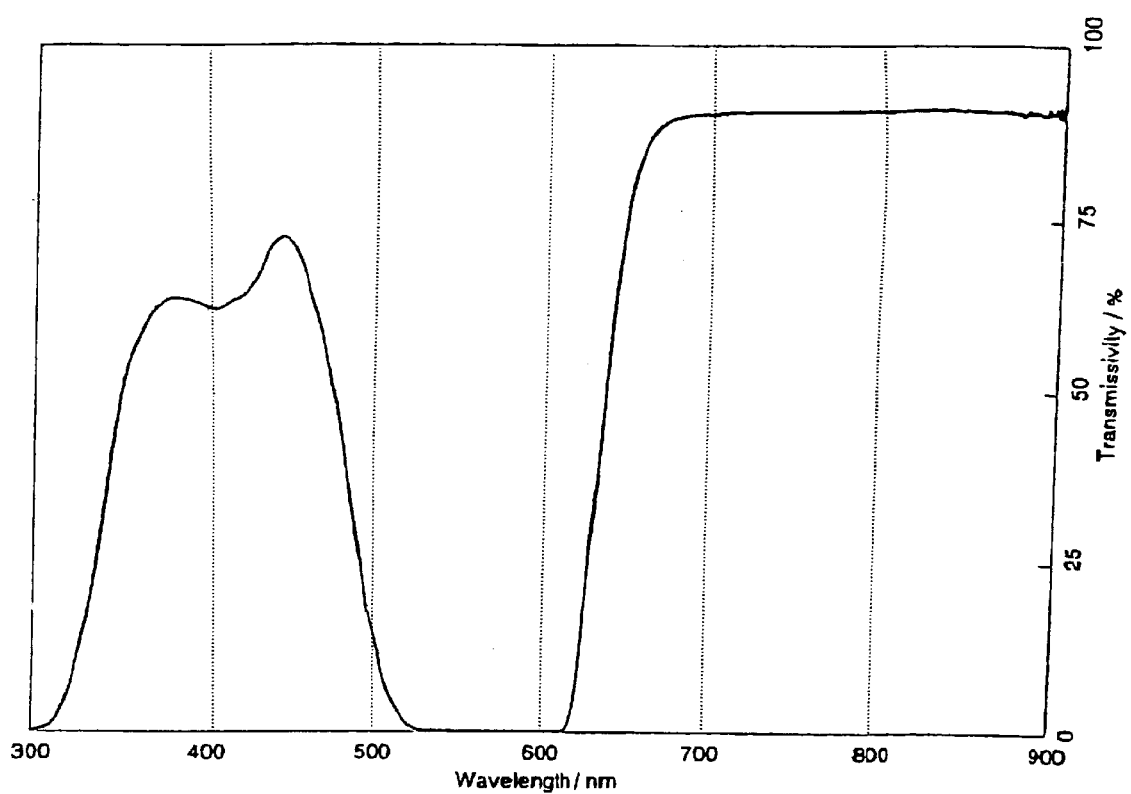
FIG. 2 is a transmissivity spectrum of an optical element.

The absorption spectrum of the optical element of Embodiment 3 manufactured as described above was the same as that of the optical element of Embodiment 1 (FIG. 2).

The direction and magnitude of the optical response of the signal light was investigated using this optical element when the incidence power of the control light was 20 mW as in Embodiment 1. The maximum value of ΔT of the response in the direction in which the signal light intensity decreases was 88%, and the maximum value of ΔT' of the response in the direction in which the apparent signal light intensity increases was 46%. In other words, the optical response was larger than in the case of Embodiment 2. It may be considered that the formation of the thermal lens proceeds smoothly due to the heat insulation films which sandwich the light absorption film.

On the other hand, in the case of Embodiment 2, the dye density in the light absorption film and the thickness of the light absorption film is equivalent to that of Embodiment 3, but the optical response is small. This is thought to be because, as there is no heat insulation film, the energy of the control light absorbed in the light absorption film is rapidly taken up by the heat transfer film, and formation of a thermal lens is prevented.

COMPARATIVE EXAMPLE 3

An optical element was manufactured without changing the dye density in the light absorption film of the optical element of Embodiment 1, and changing only the thickness of the light absorption film by 0.01 times to 0.2 μm . When an optical response test was performed, an optical response was not detected. This is thought to be because the dye amount of the light absorption film is small, the heat emitted due absorption of the control light is small, and the heat due to absorption of control light is rapidly taken up by the heat transfer film which interferes with the formation of a thermal lens.

[Embodiment 4]

A refractive index distribution type convex lens was manufactured from an inorganic glass type material using an inorganic ion diffusion phenomenon according to the method described in [M.Oikawa, K. Iga: Appl.Opt., 21(6), 1052–1056(1982)]. A gold deposition film was provided as a mask-reflecting film on a glass substrate, and a circular window of diameter 400 μm was formed by photolithography. Next, the assembly was immersed in a fused salt and a refractive index distribution was formed by ion exchange. This ion exchange was promoted by applying an electric field for several hours, and a lens of diameter 0.9 mm, focal length 2 mm and numerical aperture NA=0.23 was thereby formed.

A light transmitting layer-heat insulation film of thickness 2 mm comprising methyl polymethacrylate was attached by the casting method on the reflecting film side on this glass substrate.

Using the method of manufacturing a composite optical thin film described in Japanese Patent No. 2599569, (i) a light absorption film comprising DODCI as dye and poly(2-hydroxypropylmethacrylate) as matrix resin in which the dye density of the dye/polymer film was adjusted to $1.25 \times 10^{-1}$ mol/l were laminated a light transmitting, and lay-heat insulation film (ii) a heat insulation film comprising only poly(2-hydroxypolymethacrylate) (film thickness 10 μm) were laminated or deposited on a light absorption film, a cover glass (18 mm×18 mm×thickness 0.150 mm) was superimposed as a heat transfer film, and the assembly was subjected to heat and pressure under vacuum (vacuum hot pressing) to give a "convex lens/light transmitting lay-heat insulation film/light absorption film/heat insulation film/heat transfer film" as one form of the optical element of this invention. The film-forming conditions were adjusted so that the thicknesses of the heat transfer film and light absorption film comprising poly(2-hydroxypropylmethacrylate) were 10 μm after vacuum hot pressing.

The optical element of Embodiment 4 manufactured as described above was fitted to an optical device identical to that of Embodiment 1, except that the condenser lens 7 was removed and the numerical aperture of the light-receiving lens was 0.1. Signal light and control light were directed toward the apertures provided in the reflecting film of the optical element of Embodiment 4 and arranged to be perpendicularly incident on the surface of the optical element via the refractive index distribution type convex lens formed in the glass substrate instead of the condenser lens 7 of Embodiment 1. For the signal light, the light emitted by a continuous oscillation output 3 mW semiconductor laser of oscillation wavelength 694 nm was beam shaped to give a parallel Gaussian beam of diameter approximately 0.9 mm. For the control light, the light emitted by a helium-neon laser of oscillation wavelength 633 nm was beam shaped to give a parallel Gaussian beam of diameter approximately 0.9 mm. Using the above equations (2) and (4), for both the signal light and control light, a/ω was 1 and K was approximately 0.92. The beam waist radius $\omega_1$ of the signal light was approximately 1.4 μm, and the confocal length Zc was approximately 8.7 μm. The beam waist radius $\omega_0$ of the control light was approximately 1.3 μm, and the confocal length Zc was approximately 8.0 μm. As stated above, the thickness of the light absorption film was 10 μm, and it therefore did not exceed twice the focal length of the control light (approximately 16 μm).

Optical axis adjustment of the signal light and control light was performed very simply as follows. First, only signal light was arranged to be incident, and the optic axis of the signal light (specifically, the installation position of the light source) was adjusted so that the magnitude of the signal light transmitted via the apertures in the reflecting film was a maximum. Next, only control light was arranged to be incident, and the optic axis of the control light (specifically, the installation position of the light source) was adjusted so that the magnitude of the control light transmitted via the apertures in the reflecting film was a maximum. For this adjustment, the wavelength selection-transmitting filter 20 was temporarily removed, and the intensity of the control light was measured by the photodetector 22.

Hereafter, the optical response of the optical element was measured in the same way as in the case of Embodiment 1. The same speed and magnitude was observed as in the case of Embodiment 1.

[Embodiment 5]

Figure 11:
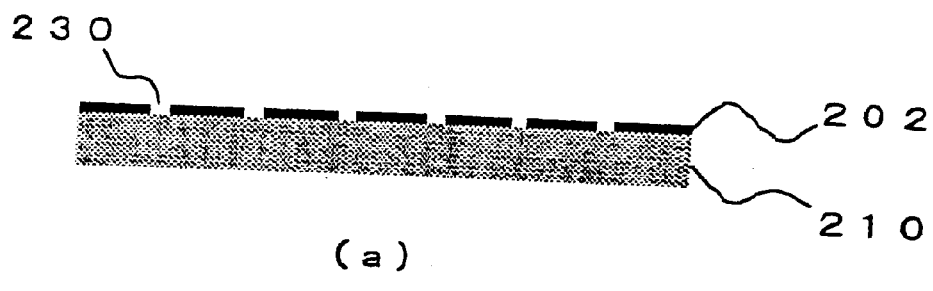
FIG. 11 is a diagram showing one step in an optical element manufacturing process according to this invention. (a) is a sectional view, (b) is a plan view.
Figure 11:
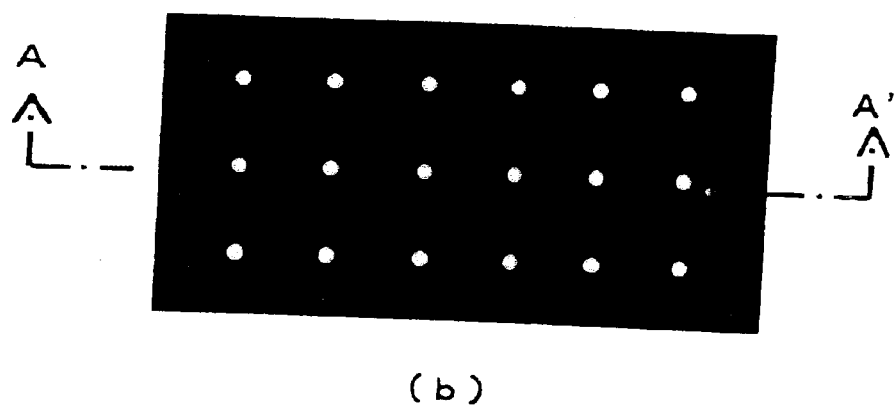
Figure 12:
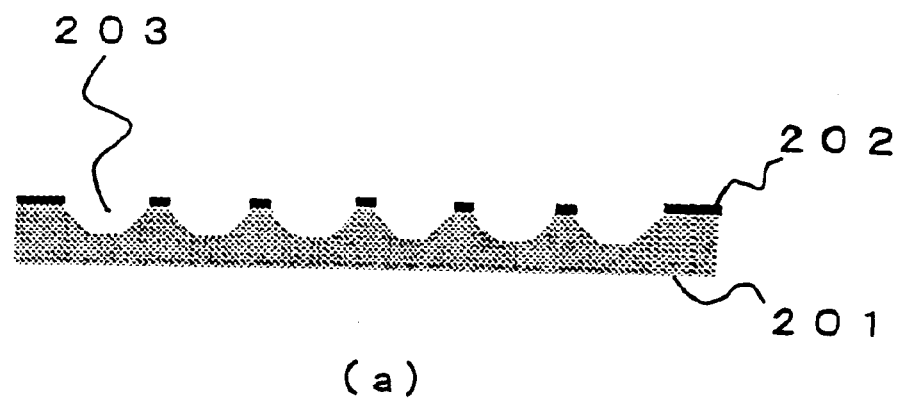
FIG. 12 is a diagram showing one step of the optical element manufacturing process according to this invention. (a) is a sectional view, (b) is a plan view.
Figure 12:
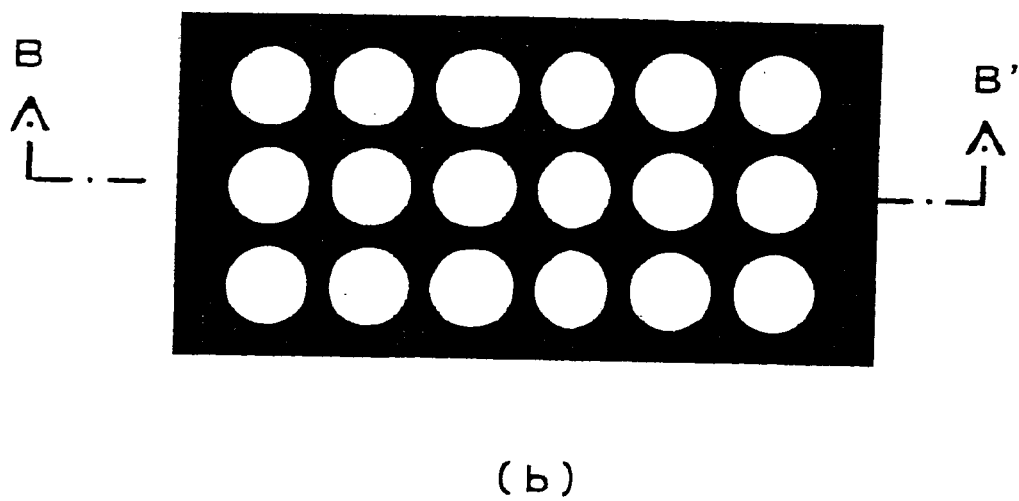
Figure 13:
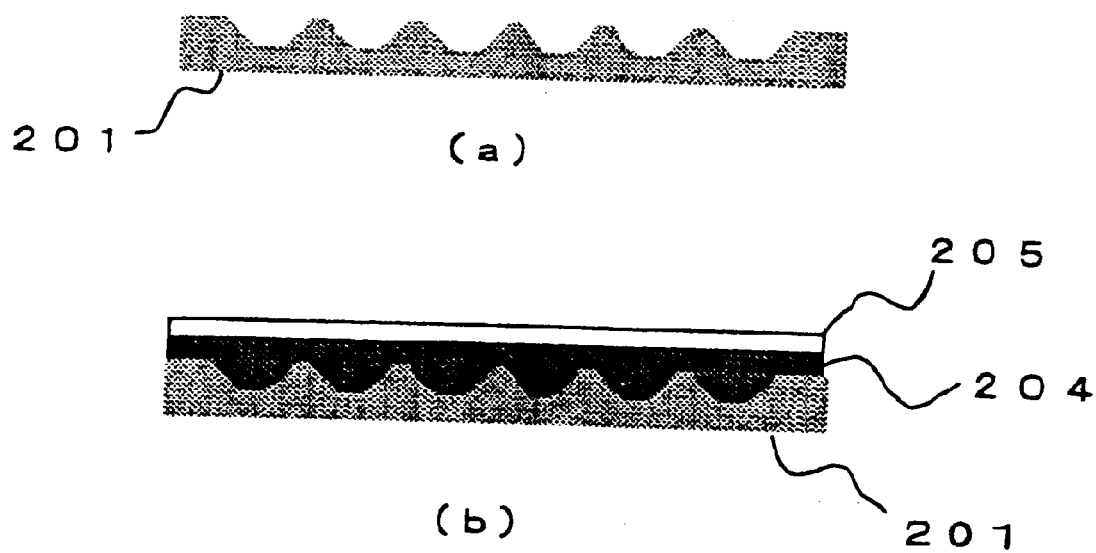
FIG. 13 is a diagram showing one step of the optical element manufacturing process according to this invention, (a) and (b) are sectional views.

A titanium plate 210 of 5 mm thickness and being 100 mm square, for example, was processed to manufacture a press plate 201. An example will be described of using this to manufacture an optical element comprising a microlens referring to FIG. 11–FIG. 15. In FIGS. 11 and 12, (a) are sectional views of the plate and/or optical element in which apertures are formed along lines A–A' and B–B', and (b) is a plan view.

As shown in FIG. 11, one face of the titanium plate 210 was polished to form a mirror surface, a photoresist layer 202 having a thickness of about 1 μm was formed thereupon by a coating method using a spin coater, and circular apertures 230 each having a diameter of 25 μm in were patterned as lattice points by a 0.1 mm pinch using a reduction projection exposure method.

Next, as shown in FIG. 12, corrosion processing was performed by the high frequency plasma etching method using carbon tetrafluoride ($CF_4$) gas, which is a well-known technique in semiconductor manufacturing processes. The pressure during the reaction was $6.5 \times 10^{-4}$ Pa and the high frequency output was 400 W. At the same time as etching proceeds in the depth direction of the titanium which is the plate metal, the periphery of the circular apertures 230 of the photoresist is also etched due to collision of ions or electrons accelerated in the high frequency plasma. The etching time was adjusted so that the diameter, which was 25 μm when etching started, finally reached 45 μm. As the diameter of the circular apertures of the photoresist increases, etching proceeds not only in the depth direction but also in a direction that intersects perpendicularly with this so that the cross-section of the apertures 203 is an arc of a circle. In the case of high frequency plasma etching, isotropic chemical etching and anisotropic physical etching are generally mixed, and conditions such as the type of gas, pressure and high frequency power can change the ratio of isotropy to anisotropy. For example, by adjusting the etching conditions (type of gas, pressure and high frequency power) to emphasize isotropic etching, it was possible to perform control so that the curvature radius of the circular crosssection of the apertures obtained was a comparatively high value of 102 μm. On the other hand, when for example the pressure was reduced compared to the aforesaid etching conditions and the high frequency power was increased to 450 W, anisotropic etching was emphasized, and the curvature radius of the arc cross-section of the apertures obtained was reduced to 43 μm.

The same control as this can also be performed by selecting the photoresist. Specifically, when annealing was performed at a high temperature so that post-annealing hardness increased, and when a photoresist was used which is particularly hard to etch by gas, the curvature radius of the arc cross-section of the apertures obtained became smaller. Thus, by controlling the etching conditions, it is possible to control the curvature radius of the cross-section of the apertures 203 of the press plate 201, and the press plate 201 can be manufactured with any desired cross-sectional shape.

After the etching process, following removal of the photoresist removal (washing), the original press plate 201 was polished to a mirror surface by chemical polishing so as to reduce the surface roughness.

Figure 14:
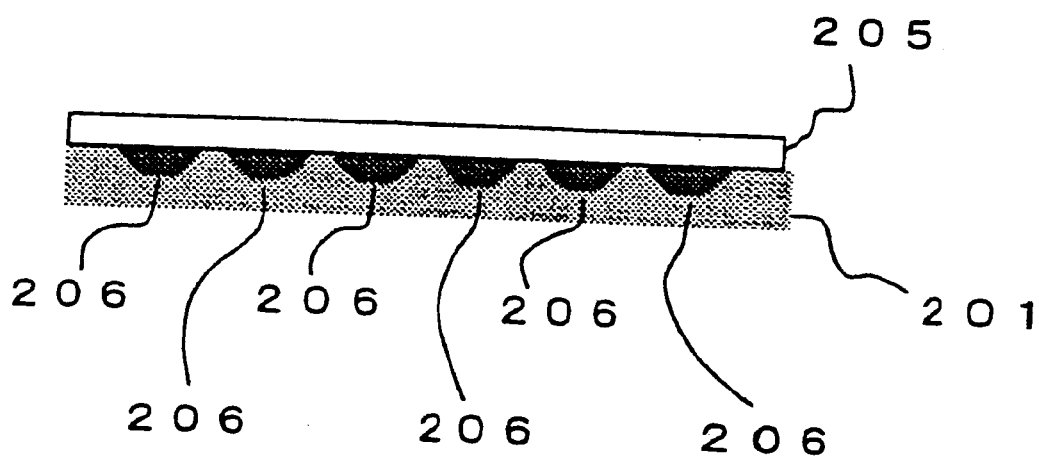
FIG. 14 is a diagram showing one step of the optical element manufacturing process according to this invention as a sectional view.

A powder 204 of polymethylmethacrylate that had been purified by reprecipitation and dried in a vacuum to remove volatile components was sprinkled on the surface of this press plate 201 manufactured as described above (FIG. 13(*a*)). A glass substrate 205 of thickness approximately 2 mm was placed over this (FIG. 13(*b*)), and polymethylmethacrylate was interposed between the glass substrate 205 and the press plate 201 by the vacuum hot press method (Japanese Patent 1882011) so as to form a lens array 206 (FIG. 14).

Figure 15:
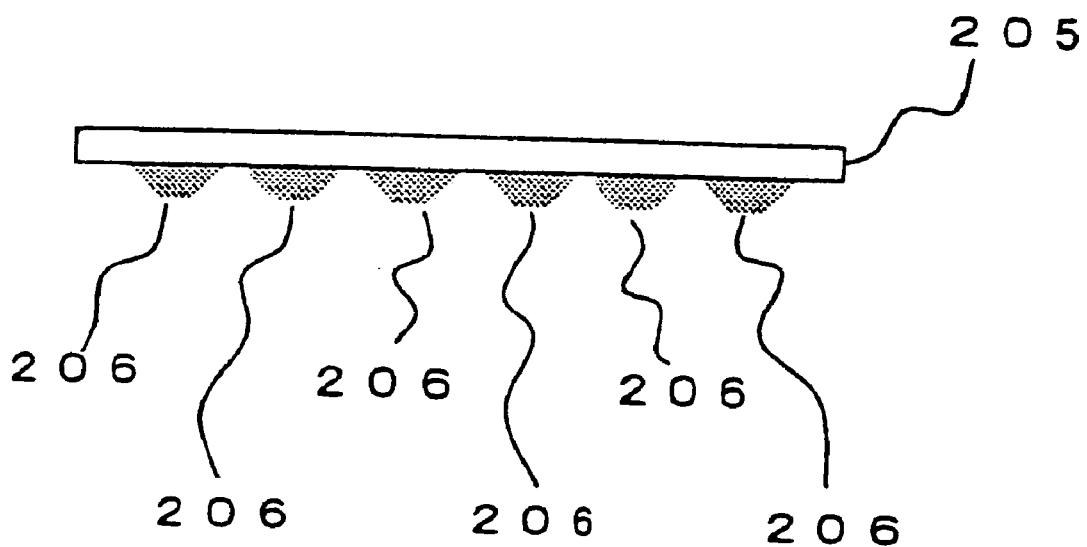
FIG. 15 is a diagram showing an example of multiple planoconvex lenses formed on a substrate in one step of the optical element manufacturing process according to this invention as a sectional view.

After cooling, the press plate 201 was peeled away to leave the polymethylmethacrylate lens array 206 on the glass substrate 205, as shown in FIG. 15.

[Embodiment 6]

Figure 17:
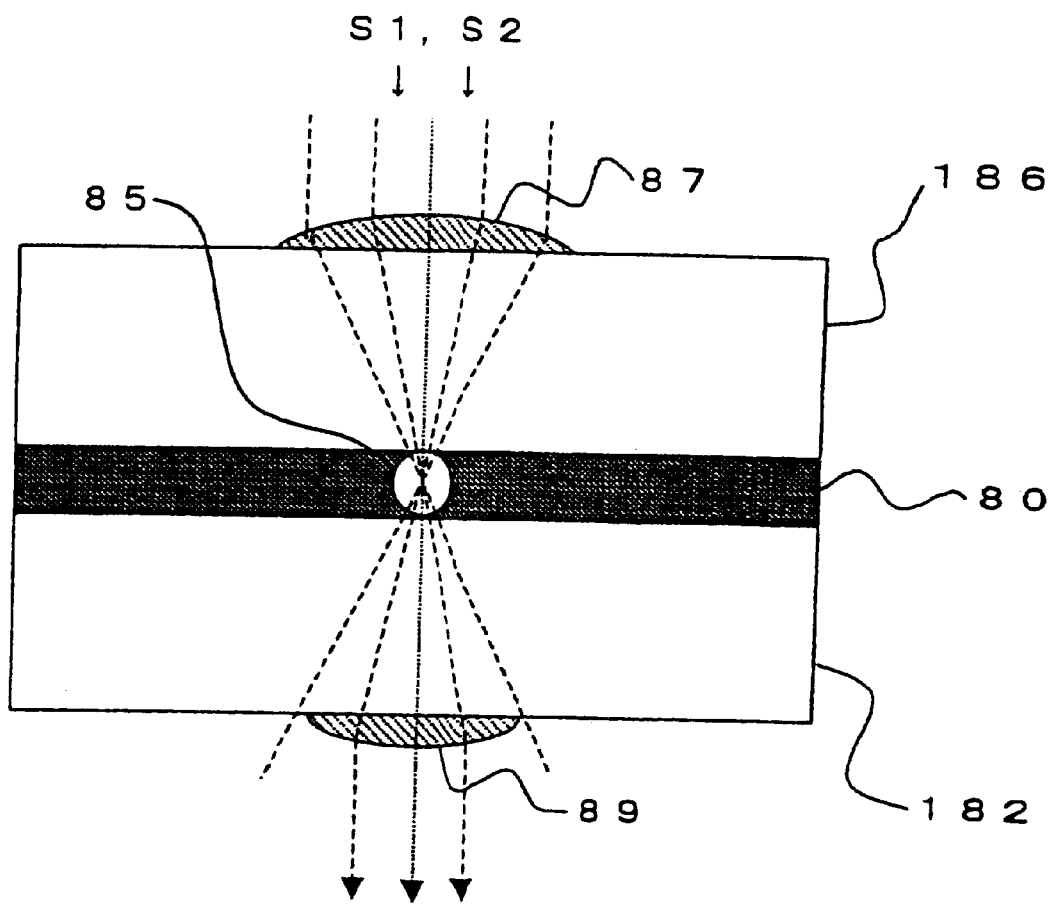
FIG. 17 is a sectional view showing a typical construction of the optical element according to this invention.

The shape of a concave surface 3 was adjusted by controlling the manufacturing conditions of the lens plate 1 by the method described in Embodiment 1, as shown in FIG. 17. A convex lens 87 of effective aperture radius 250 $\mu$m, focal length 1.00 mm and numerical aperture NA 0.25 was formed on a glass substrate 186 (thickness 1.510 mm), and a convex lens 89 of effective aperture radius 130 $\mu$m, focal length 1.00 mm and numerical aperture NA 0.13 was formed on a glass substrate 182 (thickness 1.500 mm), using polymethylmethacrylate (refractive index 1.49). The lens plate was removed in the last step of the optical element manufacturing process to protect the convex lenses 87 and 89. The glass substrates 182, 186 both function as a light transmitting film-heat transfer film.

The above "focal length" is a value obtained when the convex lenses 87, 89 are made to act as planoconvex lenses having the flat surfaces attached to a glass substrate (refractive index 1.51), parallel light is irradiated from the glass substrate side, and the light is brought to a focus in the air (refractive index 1). When parallel light is irradiated in the other direction, i.e. from the air side, the position of the focus must be computed considering the wavelength of the light and the refractive index of the medium through which the light passes until it reaches the focus. For example it is converged by the convex lens 87, passes through glass of refractive index 1.51 and refractive index 1.510 mm, and passes through the light absorption film 80 of refractive index 1.51, as shown in FIG. 17. If it is brought to a focus within this distance, the "focal length r'" is calculated to be approximately 1.51±(confocal length Zc)/2. On the other hand, the "focal length r''" when light emits from this focus, passes through the light absorption film 80, passes through the medium of refractive index 1.51, passes through glass of thickness 1.50 mm, and is restored to a parallel beam by the convex lens 89, is also calculated to be approximately 1.51±(confocal length Zc)/2. In other words, if the thickness of the light absorption film 80 in the optical element having the construction shown in FIG. 17 is arranged to be less than 100 $\mu$m, a signal light S2 which is incident as a parallel beam can generally be extracted as a parallel beam.

To manufacture the optical element 80, 23.0 mg of 3,3'-diethyloxadicarbocyanin iodide (common name DODCI) and 1977.0 mg of polymethylmethacrylate were dissolved in 200 ml acetone, the resulting solution was stirred into 1300 ml n-hexane, the precipitate (dye and polymer mixture) which separated was filtered, washed with n-hexane and dried under reduced pressure, and the product was crushed. The dye and polymer powder mixture obtained was heated for two days at 100° C. under ultra high vacuum of less than $10^{-5}$ Pa, volatile components such as residual solvent were completely removed, and a powder of a dye/polymer mixture was thereby obtained. 35 mg of this powder was inserted between the glass substrate 186 and the glass substrate 182, heated to 150° C. under vacuum, and the powder was pressed between the two glass plates (vacuum hot press method). In this way, the light absorption film 80 (thickness 50 $\mu$m) comprising dye/polymer was sandwiched between glass substrates. The positions of the glass plates 186, 182 were finely adjusted so that the optic axes of the convex lenses 87, 89 coincided. Specifically, reference lines were first marked for positioning a lens plate pressed between the glass plates 186, 182, the positions of the apertures 203 were determined based on these lines, two lens plates corresponding to the convex lenses 87, 89 were prepared, and the positions were adjusted so that the optic axes of the two lenses coincided based on these two reference lines.

Calculating the density of the dye/resin mixture to be 1.06, the dye concentration in the light absorption film is $2.5 \times 10^{-2}$ mol/l. The transmissivity of this film was 28.3% at the wavelength (633 nm) of the control light S1, and 90.2% at the wavelength (694 nm) of the signal light S2.

As the last step of the manufacturing process, the optical element subjected to vacuum hot press was cooled to room temperature and taken out in the atmosphere, and the lens plate was removed.

In the above procedure, the light absorption film 80 was manufactured after forming the convex lenses on the glass substrate, however the procedure can be reversed, i.e. the convex lenses 87, 89 may be formed on the surfaces of the glass substrates 186, 182 while taking care to align the optical axes of the two convex lenses after manufacturing the light absorption film 80.

The light absorption film 80 may also be formed at the same time as the two convex lenses 87, 89.

In any case, it is important to carefully control the manufacturing conditions so that the thickness of the light absorption film 80 is the above design value, and so that the optical axes of the two convex lenses coincide.

Figure 18:
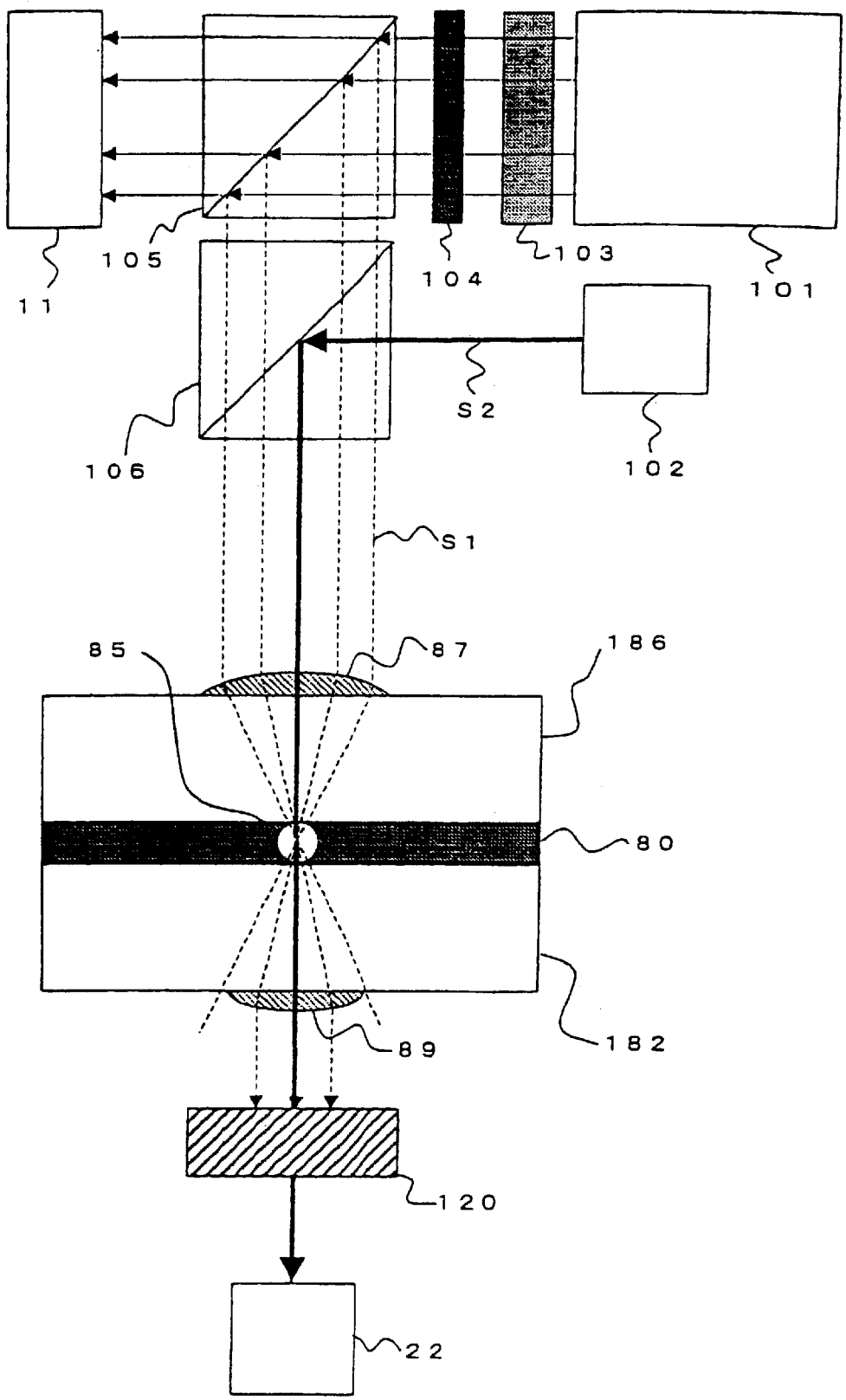
FIG. 18 is a schematic diagram showing a typical construction of a device used in implementing this invention.

In order to investigate the optical response of the optical element manufactured as described above, the optical element of this invention was installed in the measuring apparatus having the construction shown in FIG. 18.

In the device shown in FIG. 18, the condenser lens 7, film type optical element 8 and light receiving lens 9 in the device shown in FIG. 1 are replaced by the convex lenses 87, 89, the glass substrates 186, 182, and the optical element comprising the light absorption film 80.

As a source 101 of the control light S1, a helium-neon laser (oscillation wavelength 633 nm, parallel beam of diameter approximately 120 $\mu$m, Gaussian energy distribution of beam cross-section) was used.

On the other hand, as a source 102 of the signal light S2, the emission of a semiconductor laser (oscillation wavelength 694 nm, continuous oscillation output 3 mW) was beam shaped to give a parallel Gaussian beam of diameter approximately 0.5 mm.

As a ND filter 103, the same filter as the ND filter 3 of Embodiment 1 was used.

A shutter 104 was used to make the continuous wave laser used as control light flash in a pulse-like fashion. The mechanical shutter and an optoacoustic element were used in conjunction.

The half-transmitting mirror 105 was used to constantly monitor the photosignal intensity of the control light S1.

As the photodetectors 11 and 22, phototransistors were used. The light receiving signal of the photodetectors 11, 22 was monitored by an oscilloscope, not shown.

As the light mixing instrument 106, a dichroic mirror was used and adjusted so that the optical axes of the control light S1 and signal light S2 coincided.

As the effective aperture radius a on the irradiation side of the convex lens 87 is 250 µm and the numerical aperture NA is 0.25, K is approximately 3 for control light of wavelength 633 nm and beam diameter of 120 µm, and therefore the beam radius $\omega_0$ of the light beam in the region where the photon density in the vicinity of the focus of the convex lens 87 on the irradiation side is the highest, i.e. the beam waist, is approximately 4 µm, and the confocal length Zc is 72 µm.

Similarly, for signal light of wavelength 694 µm and beam diameter 0.5 mm, k is approximately 0.92, and the beam radius $\omega 0$ of the light beam in the beam waist, is approximately 2.5 µm, and the confocal length Zc is 27 µm. In other words, for the optical element of this embodiment, the relation of the magnitude of the control light beam to that of the signal light beam is approximately 8:5 in terms of beam diameter and approximately 5:2 in terms of beam cross-section, i.e. the control light is more intense. Also, the film thickness of the light absorption film 80 was 50 µm, and did not exceed twice the confocal length Zc of the control light (72 µm).

The convex lens 89 on the light receiving side is means for restoring the signal light and control light, which was converged by the convex lens 87 on the irradiating side, irradiated to the light absorption film 80, and transmitted through the glass substrate 182 via the light absorption film 80 from the glass substrate 186, to a parallel beam. To obtain signal light of sufficient magnitude with good reproducibility, it is desirable to use a lens of smaller aperture than that of the convex lens 87 on the irradiating side. According to this embodiment, a lens of numerical aperture 0.13 was used as the convex lens 89 on the light receiving side, i.e. the numerical aperture of the light convex lens 89 on the light-receiving lens was made smaller than the numerical aperture of 0.25 of the convex lens 87 on the irradiating side.

As a wavelength selection-transmitting filter 120, the same filter was used as the filter 20 in Embodiment 1.

In the optical apparatus of FIG. 18 having the aforesaid construction, the control light beam emitted by the light source 101 passes through the ND filter 103 for adjusting transmitted light intensity by increasing or decreasing transmissivity, passes through the shutter 104 for making the control light flash in a pulse-like fashion, and is split by the half-transmitting mirror 105.

As in the case of Embodiment 1, the power of the control light that is incident on the optical element is adjusted to from 0.5 mW to 25 mW by the ND filter 103.

The control light that is split and reflected by the half-transmitting mirror 105 passes through the light mixing instrument 106 and the convex lens 87 on the irradiating side, and is converged and irradiated toward the light absorption film 80 in the optical element. After the control light beam that passed through the optical element passes through the convex lens 89 on the light receiving side, it is blocked by the wavelength selection-transmitting filter 120.

The signal light beam S2 emitted by the source 102 is mixed by the light mixing instrument 106 so that it is propagated on the same optical path as the control light S1, passes through the convex lens 87 on the irradiation side and is converged and irradiated to the optical element. The light that has passed through the element passes through the convex lens 89 on the light receiving side and the wavelength selection-transmitting filter 120, and is received by the photodetector 22.

A light control test was performed using the optical device of FIG. 18, and the photosignal intensity variation shown in FIG. 5 or 6 was observed as in the case of Embodiment 1. In FIG. 5 and/or FIG. 6, 111 is the light receiving signal of the photodetector 11, and 222 and 223 are the light receiving signals of the photodetector 22. The differences in the light receiving signals 222, 223 obtained from the photodetector 22 are as follows.

In the arrangement of FIG. 18, the control light S1 and signal light S2 are converged and arranged to be incident on the light absorption film 80 in the optical element. If the convex lens 87 is finely adjusted in manufacture so that the minimum convergence beam diameter position, i.e. the focus Fc, is near the convex lens 87 on the irradiation side of the light absorption film 80 (light incidence side), the optical response 222 is obtained in the direction in which the signal light S2 which passed through the optical element decreases.

On the other hand, if the convex lens 87 is finely adjusted in manufacture so that the focus Fc is near the convex lens 89 on the receiving side of the light absorption film 80 (light emitting side), the optical response 223 is obtained in the direction in which the apparent intensity of the signal light S2 which passed through the optical element increases.

This phenomenon may be explained by a thermal lens effect formed in a region 85 in the light absorption film 80, as in the case of Embodiment 1.

INDUSTRIAL APPLICATION

As described above, according to the optical element of this invention, and the optical control method and device using this element, by using, for example, low power laser light in the visible region as a control light, a signal light in the near infrared region can be modulated with good precision by a very simple optical apparatus without using any electronic circuitry and with a sufficiently rapid response for practical purposes. Moreover, optical axis adjustment of the control light and signal light is simple to perform, and a very compact optical control device can be provided.

According to the method of manufacturing an optical element of this invention, an optical element can be manufactured having a structure comprising a convex lens whose size, shape and refractive index are controlled, and which is laminated on a glass substrate. According to the method of manufacturing an optical element of this invention, a convex lens and an optical function part can be formed in a one-piece construction by a continuous manufacturing process in a vacuum, so a highly durable optical element can be manufactured without volatile materials which would cause optical damage during irradiation by a high power laser. Moreover, according to the optical element of this invention, the light flux density of the incident light on an optical function part can be enhanced without adding a converging optical system exterior to the optical element, hence a very compact, high performance optical element can be provided.

What is claimed is:

1. An optical element comprising at least a light absorption film for performing intensity modulation and/or light flux density modulation using a thermal lens based on a reversible refractive index distribution produced by respectively converging a control light and a signal light of different wavelengths and irradiating them to said light absorption film, the wavelength of the control light being selected from the absorption band of the light absorption film, and bringing at least the control light to a focus in the light absorption film so as to produce a temperature rise in the region of the light absorption film which absorbed the control light and the surrounding region, wherein the thickness of said light absorption film not exceeding twice the confocal length of the converged control light.

2. An optical element as defined in claim 1, wherein
a light transmitting heat insulation film in the wavelength band of said control light and said signal light and/or a heat transfer film in the wavelength band of said control light and said signal light is/are laminated on said light absorption film on the basis of at least one of the following combinations (a)–(i):
(a) Light absorption film/heat insulation film
(b) Heat insulation film/light absorption film/heat insulation film
(c) Light absorption film/heat transfer film
(d) Heat transfer film/light absorption film/heat transfer film
(e) Light absorption film/heat insulation film/heat transfer film
(f) Heat transfer film/light absorption film/heat insulation film
(g) Heat transfer film/light absorption film/heat insulation film/heat transfer film
(h) Heat transfer film/heat insulation film/light absorption film/heat insulation film
(i) Heat transfer film/heat insulation film/light absorption film/heat insulation film/heat transfer film.

3. An optical element as defined in claim 2, wherein said light absorption film and/or heat insulation film and/or heat transfer film are comprised of self-supporting materials.

4. An optical element as defined in claim 2, wherein
a light reflecting film having apertures large enough for said converged, irradiated control light and signal light to pass, is provided on the control light incidence side of said light absorption film, and is laminated on said heat insulation film and/or said heat transfer film when said heat insulation film and/or said heat transfer film is/are present.

5. An optical element as defined in claim 2, wherein
said light absorption film contains a pigment or a dye molecular aggregate which absorbs light in the wavelength band of said control light.

6. An optical element as defined in claim 2, wherein
a light transmitting film is laminated on said light absorption film, heat insulation film or light reflecting film, and a convex lens which functions as a converging means for said control light is laminated on the incidence side of said control light on said light transmitting film.

7. A light control method wherein intensity modulation and/or light flux density modulation is/are performed using a thermal lens based on a reversible refractive index distribution produced by respectively irradiating a control light and a signal, light to said convex lens provided in an optical element as defined in claim 6, and bringing at least said control light to a focus in said light absorption film so as to produce a temperature rise in the region of said light absorption film which absorbed said control light and the surrounding region.

8. A light control method as defined in claim 7, wherein
signal light flux in a region strongly affected by intensity modulation and/or light flux density modulation is separately extracted by extracting a signal light flux which diverges after it has passed through said optical element within an angular range smaller than the divergence angle of said signal light flux.

9. A light control device performing intensity modulation and/or light flux density modulation using a thermal lens based on a reversible refractive index distribution produced by respectively converging a control light and a signal light and irradiating them to a convex lens of an optical element as defined in claim 6, the wavelength of said control light being selected from the absorption band of said light absorption film, and bringing at least said control light to a focus in said light absorption film so as to produce a temperature rise in the region of said light absorption film which absorbed said control light and the surrounding region, wherein
a convex lens as converging means is provided for respectively converging said control light and signal light, the optical paths of said control light and signal light being arranged so that the regions in which the photon densities are highest in the vicinity of the foci of said control light and signal light overlap, and
said light absorption film of said optical element is arranged in a position where the regions in which the photon densities are highest in the vicinity of the foci of said control light and signal light overlap.

10. A light control device as defined in claim 9, wherein
said means which separately extracts signal light flux in a region strongly affected by intensity modulation and/or light flux density modulation is means which extracts said signal light flux which diverges after it has passed through said optical element within an angular range smaller than the divergence angle of said signal light flux.

11. A light control method wherein intensity modulation and/or light flux density modulation is/are performed using a thermal lens based on a reversible refractive index distribution produced by respectively converging a control light and a signal light of different wavelengths and irradiating them to a light absorption film of an optical element as defined in claim 1, the wavelength of said control light being selected from the absorption band of said light absorption film, and bringing at least said control light to a focus in said light absorption film so as to produce a temperature rise in the region of said light absorption film which absorbed said control light and the surrounding region.

12. A light control method as defined in claim 11, wherein
signal light flux in a region strongly affected by intensity modulation and/or light flux density modulation is separately extracted by extracting a signal light flux which diverges after it has passed through said optical element within an angular range smaller than the divergence angle of said signal light flux.

13. A light control method wherein intensity modulation and/or light flux density modulation is/are performed using a thermal lens based on a reversible refractive index distribution produced by respectively converging a control light and a signal light of different wavelengths and irradiating them to a light absorption film of an optical element as defined in claim 2, the wavelength of said control light being selected from the absorption band of said light absorption film, and bringing at least said control light to a focus in said light absorption film so as to produce a temperature rise in the region of said light absorption film which absorbed said control light and the surrounding region.

14. A light control method as defined in claim 13, wherein
signal light flux in a region strongly affected by intensity modulation and/or light flux density modulation is separately extracted by extracting a signal light flux which diverges after it has passed through said optical element within an angular range smaller than the divergence angle of said signal light flux.

15. A light control device performing intensity modulation and/or light flux density modulation using a thermal lens based on a reversible refractive index distribution produced by respectively converging a control light and a signal light of different wavelengths and irradiating them to a light absorption film of an optical element as defined in claim 2, the wavelength of said control light being selected from the absorption band of said light absorption film so as to produce a temperature rise in the region of said light absorption film which absorbed said control light and the surrounding region, wherein converging means is provided for respectively converging said control light and signal light, the optical paths of said control light and signal light being arranged so that the regions in which the photon densities are highest in the vicinity of the foci of said control light and signal light overlap, and said light absorption film of said optical element is arranged in a position where the regions in which the photon densities are highest in the vicinity of the foci of said control light and signal light overlap.

16. A light control device as defined in claim 15, wherein said means which separately extracts signal light flux in a region strongly affected by intensity modulation and/or light flux density modulation is means which extracts said signal light flux which diverges after it has passed through said optical element within an angular range smaller than the divergence angle of said signal light flux.

17. A light control device performing intensity modulation and/or light flux density modulation using a thermal lens based on a reversible refractive index distribution produced by respectively converging a control light and a signal light of different wavelengths and irradiating them to a light absorption film of an optical element as defined in claim 1, the wavelength of said control light being selected from the absorption band of said light absorption film so as to produce a temperature rise in the region of said light absorption film which absorbed said control light and the surrounding region, wherein converging means is provided for respectively converging said control light and signal light, the optical paths of said control light and signal light being arranged so that the regions in which the photon densities are highest in the vicinity of the foci of said control light and signal light overlap, and said light absorption film of said optical element is arranged in a position where the regions in which the photon densities are highest in the vicinity of the foci of said control light and signal light overlap.

18. A light control device as defined in claim 17, wherein said means which separately extracts signal light flux in a region strongly affected by intensity modulation and/or light flux density modulation is means which extracts said signal light flux which diverges after it has passed through said optical element within an angular range smaller than the divergence angle of said signal light flux.

19. An apparatus for performing intensity modulation and/or light flux density modulation comprising:

a light absorbing film operatively arranged to absorb a control light and transmit a signal light, wherein the apparatus is operatively arranged to focus the control light in the light absorbing film, and wherein the light absorbing film has a thickness not exceeding twice the confocal length of the focused control light.

20. The apparatus as in claim 19, wherein the apparatus is operatively arranged to transmit the signal light through the apparatus.

21. A method for performing intensity modulation and/or light flux density modulation, the method comprising the steps:

focusing a control light in a light absorbing film having a thickness not exceeding twice the confocal length of the focused control light;

absorbing the control light by the light absorbing film; and transmitting a signal light through the light absorbing film.

* * * * *